United States Patent
Schreck et al.

(10) Patent No.: US 12,463,780 B2
(45) Date of Patent: Nov. 4, 2025

(54) COMMUNICATION SYSTEMS AND METHODS FOR TRANSMITTING AND PROCESSING OF DATA

(71) Applicant: Intel Corporation, Santa Clara, CA (US)

(72) Inventors: Jan Schreck, San Jose, CA (US); Wei Mao, San Jose, CA (US); Nageen Himayat, Fremont, CA (US); Shilpa Talwar, Cupertino, CA (US); Ariela Zeira, Encinitas, CA (US)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 17/558,617

(22) Filed: Dec. 22, 2021

(65) Prior Publication Data
US 2023/0198718 A1    Jun. 22, 2023

(51) Int. Cl.
    *H04W 4/38*      (2018.01)
    *G06N 3/08*      (2023.01)
    (Continued)

(52) U.S. Cl.
    CPC .......... *H04L 5/0053* (2013.01); *H04L 25/497* (2013.01)

(58) Field of Classification Search
CPC ... H04L 5/0053; H04L 25/497; H04L 1/0047; H04L 1/0042; G06N 3/0455; G06N 3/08; G06V 10/82
See application file for complete search history.

(56) References Cited

U.S. PATENT DOCUMENTS

| | | | | |
|---|---|---|---|---|
| 2021/0334703 A1* | 10/2021 | Salamat | .................. | G06F 15/80 |
| 2022/0019441 A1* | 1/2022 | Rosing | .................. | G06N 3/084 |
| 2022/0138382 A1* | 5/2022 | Voelker | .................. | G06F 30/17 |
| | | | | 703/2 |

FOREIGN PATENT DOCUMENTS

| | | |
|---|---|---|
| WO | 2021158313 A1 | 8/2021 |
| WO | 2023047197 A1 | 3/2023 |

OTHER PUBLICATIONS

Near-Channel classifier:symbiotic communication and classification in high-dimensional space (Year: 2021).*

(Continued)

*Primary Examiner* — Faruk Hamza
*Assistant Examiner* — Abusayeed M Haque
(74) *Attorney, Agent, or Firm* — Viering, Jentschura & Partner mbB

(57) ABSTRACT

According to various examples, a communication system is described comprising a receiver configured to receive, for each of a plurality of object classes, via a wireless communication channel shared among transmitters of a respective set of transmitters, a superposition of transmitted hyperdimensional code words, comprising, for each transmitter of the respective set of transmitters, a hyperdimensional code word transmitted via the wireless communication channel and encoding data of an object of the object class acquired by the transmitter, a memory configured to store, for each of the plurality of object classes, the received superposition in association with the class, a processor configured to classify a hyperdimensional code word representing an object to be classified by correlating the hyperdimensional code word with each stored superposition and to generate a classification result corresponding to the object class associated with a superposition fulfilling a predetermined criterion based on correlation results.

17 Claims, 15 Drawing Sheets

(51) Int. Cl.
G06V 10/82 (2022.01)
H04L 5/00 (2006.01)
H04L 25/497 (2006.01)

(56) References Cited

OTHER PUBLICATIONS

3GPP-RAN-WG3 Meetng#14, R3-001917 (Year: 2000).*
Hersche, Michael et al., "Near-channel classifier: symbiotic communication and classification in high-dimensional space", Dec. 1, 2021, 15 pages, vol. 8, Issue 1, Springer Open, Brain informatics.
Bian, Chenghong et al., "Deep learning Based Near-Orthogonal Superposition Code for Short Message Transmission", Nov. 5, 2021, 6 pages, v1, arXiv.
Chin-Wie, Hsu et al., "Collision-Tolerant Narrowband Communication Using Non-Orthogonal Modulation and Multiple Access", 2019 IEEE Global Communications Conference (GLOBECOM), Dec. 9, 2019, 6 pages, IEEE.
Hun-Seok, Kim, "HDM: Hyper-Dimensional Modulation for Robust Low-Power Communications", 2018 IEEE International Conference on Communications (ICC), May 20, 2018, 6 pages, IEEE.
Search Report issued for the corresponding European patent application No. 22201677.6, dated Apr. 26, 2023, 10 pages (for informational purposes only).
Pentti Kanerva, "Hyperdimensional Computing: An Introduction to Computing in Distributed Representation with High-Dimensional Random Vectors" Cognitive computation, 1(2):139-159, (2009).
Thomas, Anthony et al., "Theoretical Foundations of Hyperdimensional Computing", 2020, 33 pages, arXiv preprint arXiv: 2010.07426.
Frady, E. Paxon et al., "A theory of sequence indexing and working memory in recurrent neural networks", 2018, 62 pages, Neural computation.
Mohsen Imani et al., "AdaptHD: Adaptive Efficient Training for Brain-Inspired Hyperdimensional Computing", 2019, 4 pages, In 2019 IEEE Biomedical Circuits and Systems Conference (BioCAS).
S. Prakash et al., "Coded Computing for Low-Latency Federated Learning over Wireless Edge Networks", Jan. 2021 18 pages, IEEE JSAC.

* cited by examiner

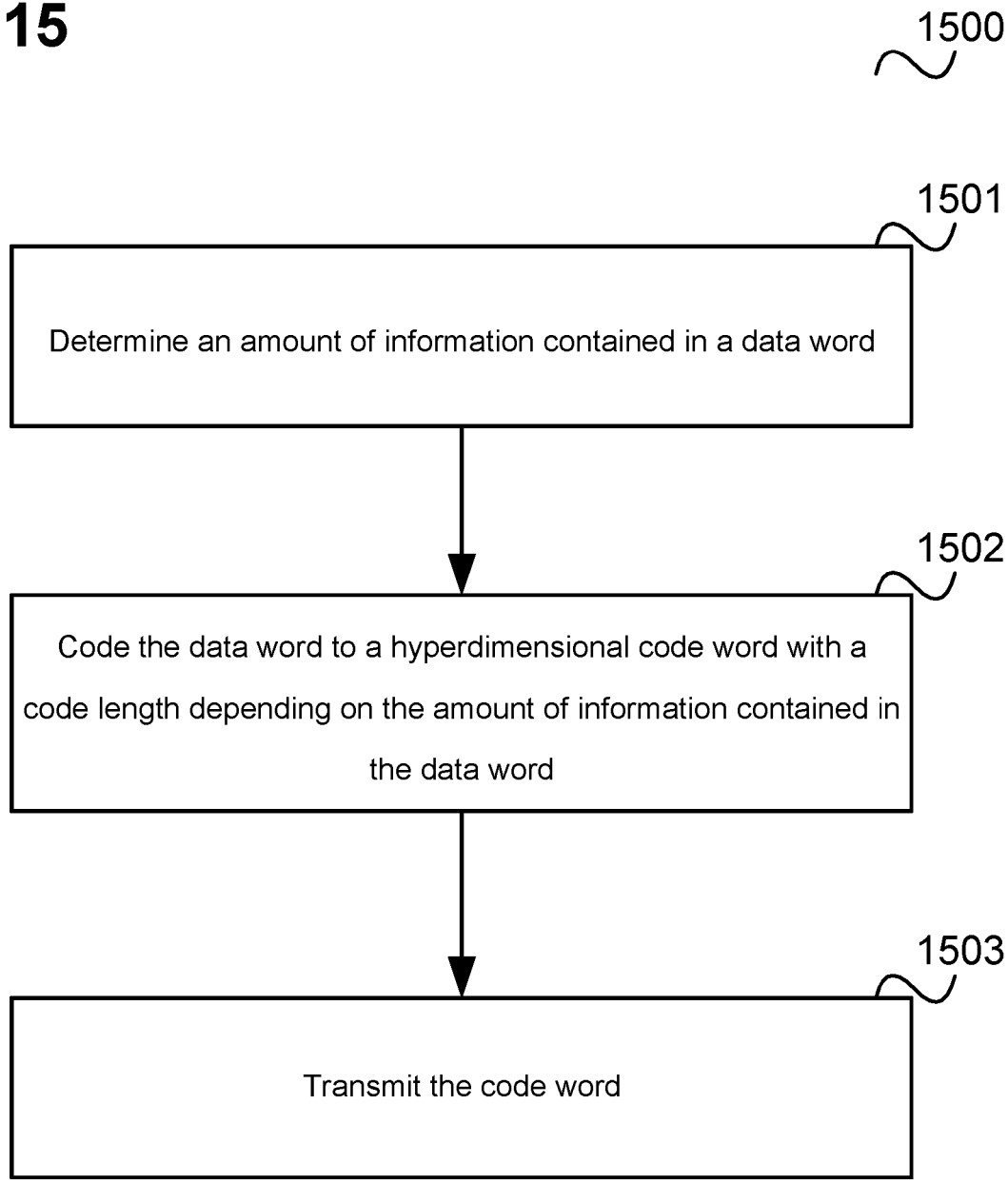

COMMUNICATION SYSTEMS AND METHODS FOR TRANSMITTING AND PROCESSING OF DATA

TECHNICAL FIELD

Exemplary implementations described herein generally relate to communication systems and methods for transmitting and processing of data.

BACKGROUND

Increasing the efficiency of data processing and data communication is a permanent goal in the development of data processing systems and communication systems.

Hyperdimensional (HD) computing—also known as vector symbolic architectures—is an emerging compute paradigm that promises energy-efficient and robust computations for a large number of applications. HD computing-based frameworks are able to store and recall specific patterns and HD computing has been shown to have the potential to replace conventional implementations of machine learning algorithms like support vector machines and single-layer or multi-layer neural networks formed of one or more (multi-layer-)perceptrons arranged in one or more (e.g. fully connected) neural network. An example for an application of HD computing is processing in memory (PIM) that enables basic data manipulations in memory.

Approaches are desirable which exploit HD computing to allow efficient transmission and processing of data, in particular in context of wireless communication.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 15 shows a flow diagram illustrating a method for transmitting data according to an embodiment.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
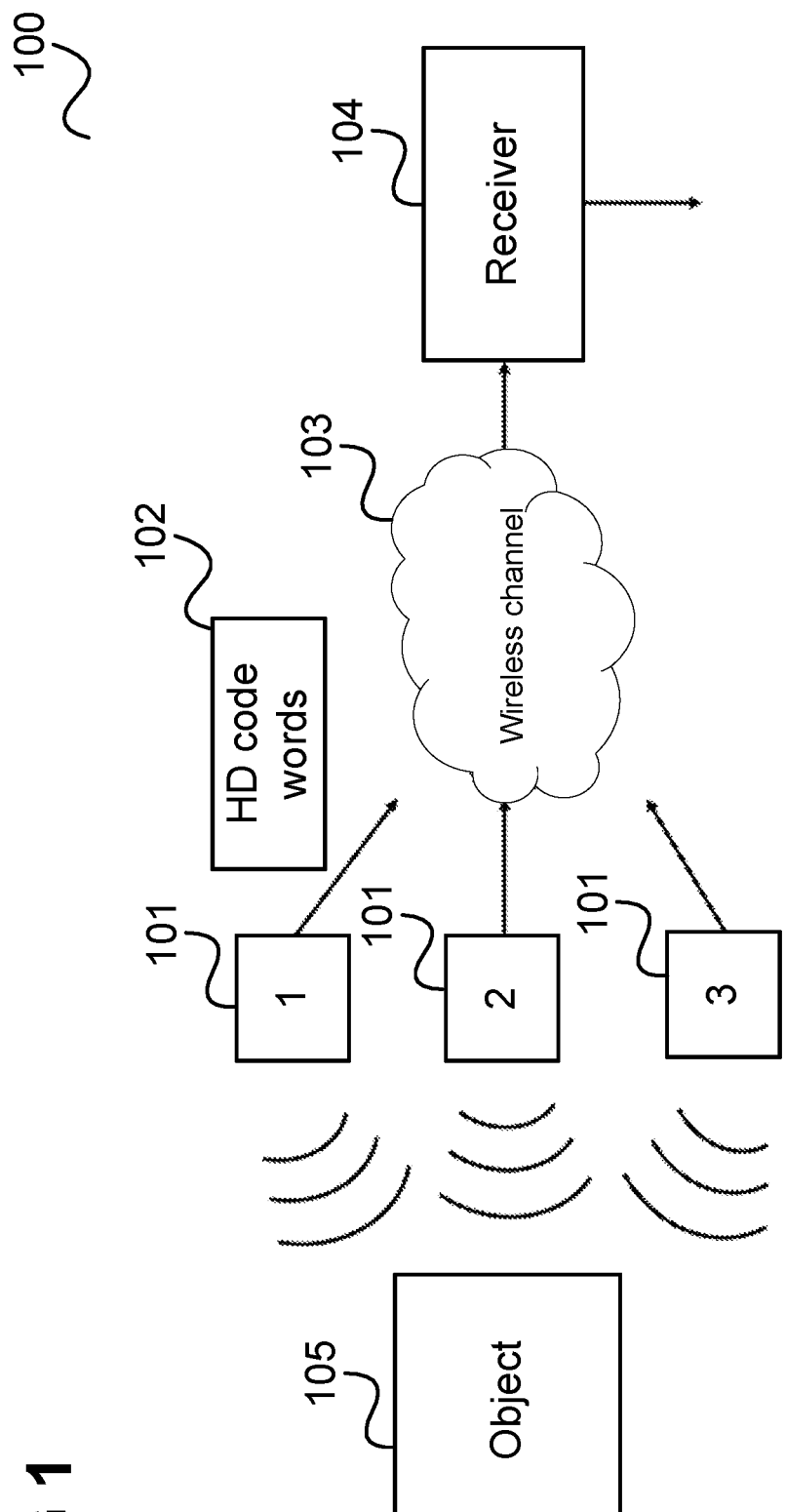
FIG. 1 shows an exemplary communication system according to an embodiment.

FIG. 1 shows an exemplary communication system 100 according to an embodiment.

The communication arrangement 100 includes a plurality of transmitters 101 (i.e. transmitting communication devices) transmitting HD (hyperdimensional) code words 102 via a wireless channel 103 to at least one receiver 104.

In the following, methods and signaling schemes that utilize HD representations for wireless distributed AI (Artificial Intelligence) or ML (Machine Learning) scenarios are described. Specifically, in the following, superposition of the transmitted code words 102 by interference of their transmissions, is exploited. Interference is usually viewed as an obstacle to communication in wireless networks. In the following, in particular, an approach is described which can be seen to exploit interference to enable distributed training (and usage, i.e. inference) of HD computing-based AI (or ML) models. By exploiting the superposition principle of the wireless channel 103, the approach harnesses interference and therefore significantly reduces overhead and latency of distributed training and inference of AI models. The inherent robustness of HD representations enables distributed training and inference.

According to various embodiments, over-the-air computation is used (for combining the code words 102 by superposition by the wireless channel 103). Over-the-air computation is very amenable to HD computing due to the robustness offered by the HD mapping (i.e. the encoding of data to HD code words). Various embodiments can be seen to be based on an adaptation of over-the-air-computing over wireless links to the HD context and the fact that the inherent robustness of HD encoded data helps with errors and synchronization issues that may be introduced over wireless links. Embodiments can further be seen to go into the direction of enabling the convergence of computation and communication.

The transmitters 101 may for example be sensor devices which capture sensor data of an object 105, and encode the captured sensor data to the HD code words 102.

An exemplary use case is that several sensor nodes 101 (e.g., cameras, radars, etc.) observe the same object 105 (e.g. by observing a certain area, e.g. an area in a factory or warehouse). Each sensor device 101 is equipped with a wireless transceiver and communicates on the same spectral resources. The sensor devices 101 transmit the measured sensor data (e.g. contained in sensor signals captured by the sensor devices 101) to the receiver 104 (or multiple receivers 104). According to various embodiments, the (or each)

receiver 104 implements a compute node whose output is a classification of the object 105 or its trajectory or specific actions. It should be noted that this is only an exemplary application and the approaches described in the following may be and applied to a variety of distributed scenarios (in particular ML scenarios).

For the following description, the following model of the communication system 100 is used.

A wireless network with N transmitters 101 and M receivers 104 is assumed. The transmitters 101 are indexed with i and the receivers 104 with j. Each transmitter 101 observes object sensor data $s_i$ and generates a HD encoded vector $\phi(s_i)=x_i \in F^d$, where F may be a finite field or a set of integers. It should be noted that each HD vector could potentially represent an aggregate data structure, generated by binding and bundling many different pieces of information together. The channel coefficient for the transmission from transmitter i to receiver j via the wireless channel 103 is given by $h_{ij}$ and is assumed (to facilitate analysis of the system) to be constant over the transmission of a single HD code word $x_i$. This is not required in practice. Each transmitter $i=1, \ldots, N$ is equipped with an encoder E, that maps a code word to a real or complex valued n dimensional signal $\varepsilon_1(x_i)=z_i \in \mathbb{C}^n$.

It is assumed that each receiver 104 is not interested in the individual code words $x_i$. The goal of the receiver 104 is rather to reliably recover a function of the HD encoded code words $u_j=f(x_i, \ldots, x_N)$.

Figure 2:
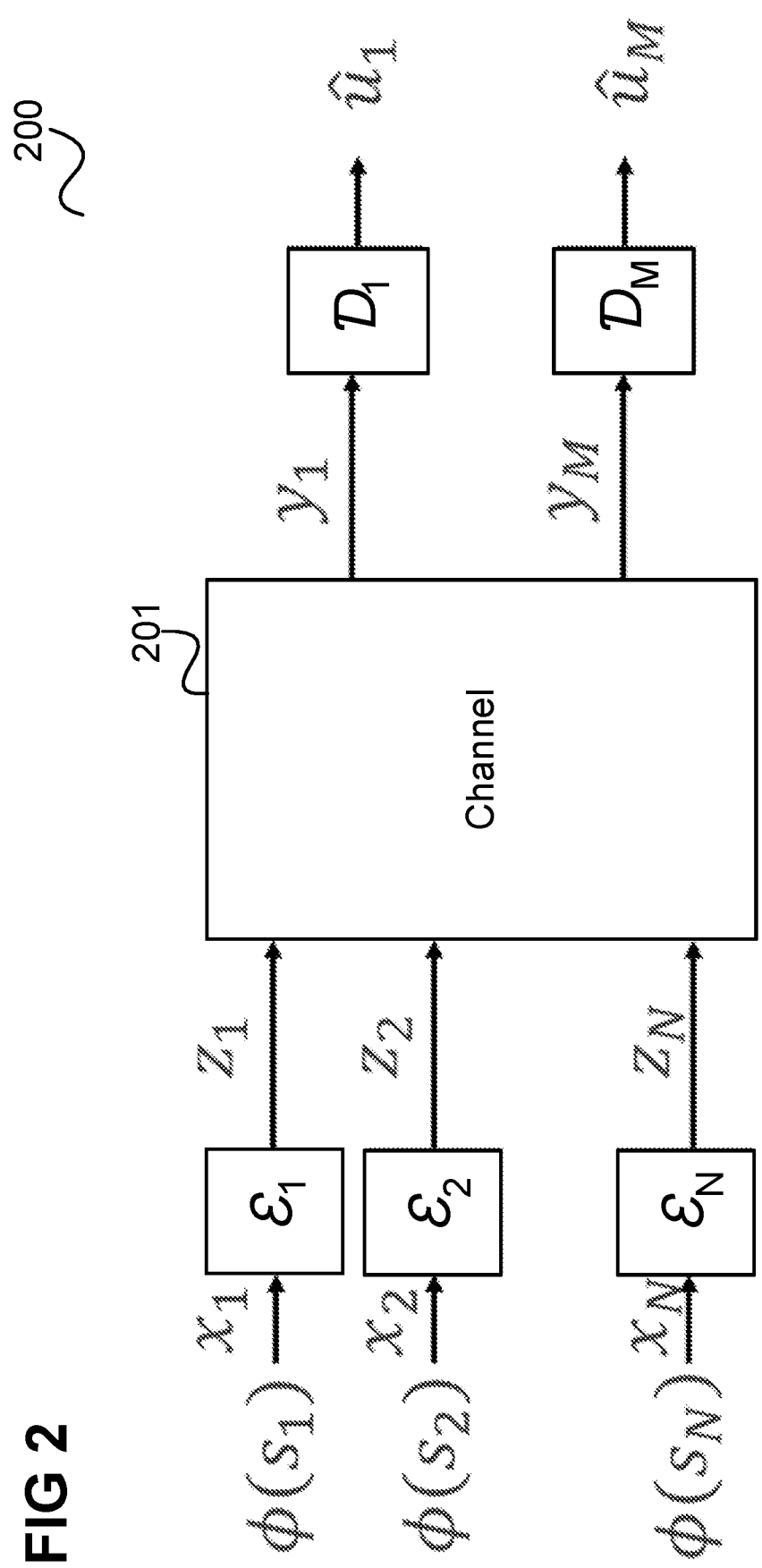
FIG. 2 illustrates the transmission of encoded hyperdimensional (HD) code words via a channel and their decoding.

FIG. 2 illustrates the transmission of encoded HD code words via a channel 200 (corresponding to channel 103) and their decoding.

The signal that the receiver j receives when the transmitters 101 send the code words $x_i$ (encoded to $z_i=\varepsilon_i(x_i)$) is denoted by $y_j$. The receiver j is equipped with a decoder $\mathcal{D}_j$ that maps the observed channel output $y_j$ to an estimate $\hat{u}_j, = \mathcal{D}(y_j)$. In the following, various embodiments that define different encoder-decoder pairs that enable computation of various functions $u_j=f(x_1, \ldots, x_N)$ over-the-air (i.e. enable the receiver j to estimate $u_j$ from $y_j$).

The robustness provided by HD computing allows realizing over-the-air computation approaches. Since HD representations embed relatively small amounts of data in a large (hyper-dimensional) vector space, they are inherently robust to noise and other distortions. In fact, it has been shown for certain HD architectures that even in case 50% of the elements of a HD vector (i.e. HD code word) are corrupted it is possible to reliable operate on the HD vector and decode the HD vector with high probability.

An HD code word can represent an aggregate data structure constructed by binding and bundling many different pieces of information together. In this context, functions of interest may be the following.

1) In HD computing bundling may be used to overlay given HD code words. Bundling operations are mathematically given by the superposition of code words $$u_j = f(x_1, \ldots, x_N) = \sum_{i=1,\ldots,N} a_i x_i \in F^d,$$

with some scalar coefficients $\alpha_t$ from a finite set. It should be noted that the sum operator is chosen based on the involved data types F, i.e., in a finite field $\mathbb{F}_p$ the sum is taken modulo p. Sums with $\alpha_i=1$ are the basis of commonly used bundling operations. However, weighted sums may be used in certain applications.

2) Binding is the most diverse operation in HD computation. Several binding operations are implemented based on element wise multiplications ⊗. Two HD vectors are combined by binding by computing the elementwise product α⊗b. Another binding operation uses the XOR and is equivalent to the element-wise multiplication in a bipolar space. Other multiplicative binding operations use a matrix multiplication for binding.

3) More general functions of the form $$u_j = f(x_1, \ldots, x_N) = \psi\left(\sum_{i=1,\ldots,N} \xi_i(x_i)\right),$$

with $\phi_i:F^d \to \mathbb{C}^d$ and $\psi:\mathbb{C}^d \to \mathbb{C}^d$ some arbitrary functions.

In the following, embodiments are described that enable one or multiple receivers 104 to compute functions of HD code words (i.e. HD encoded data words) without having to decode individual code words first.

In a first embodiment, sums of code words are received with symbol level synchronization.

It is assumed that there is a single receiver 104 (i.e. M=1). The present embodiment aims to calculate the function $u=\Sigma_{i=1,\ldots,n} x_i$. It is assumed that all N transmitters are sufficiently synchronized in time and frequency, such that signal received by the receiver is given by the n dimensional vector $$y = \sum_{i=1}^{N} h_i z_i + n \in \mathbb{C}^n.$$

The channel is assumed to be fixed over all n spectral resources and a channel estimate $\hat{h}_i \approx h_i$ is assumed to be available at every transmitter i. The transmitter i sends the code word $x_i$ in form of an encoded code word $$z_i = \varepsilon_i(x_i) = \frac{1}{\hat{h}_i} v(x_i).$$

where $v:F^d \to \mathbb{C}^n$ maps an HD code word to a sequence of n complex constellation points. Thus, the signal received at the receiver 104 is the linear combination of code words plus noise and thus the decoded received signal is $$\hat{u} = \mu\left(\sum_{i=1,\ldots,N} \gamma_i z_i + n\right),$$

where $$\gamma_i = \frac{h_i}{\hat{h}_i}$$

accounts for channel estimation errors and where $\mu: \mathbb{C}^n \to F^d$ is the decoding function, i.e. maps the received complex constellation into the HD space $F^d$. The mapping μ can be realized as hard decision or more sophisticated maximum likelihood-based mappings can be used. Since $x_i$ is encoded in a HD representation, relatively large noise and channel estimation errors can be tolerated.

It should be noted that if the channels are not constant over all n spectral resources, the transmitter i may use an average channel estimate $$\bar{h}_i = \frac{1}{n}\Sigma_l \hat{h}_i[l],$$

where $\hat{h}_i[l]$ is the channel estimate on resource l.

It should further be noted that if the channel is not constant over all n spectral resources, the transmitter i may use a resource dependent channel estimate $\hat{h}_i[l]$, i.e., $$\varepsilon_i(x_i[l]) = \frac{1}{\hat{h}_i[l]} x_i[l].$$

In a second embodiment (for computation of a function of HD code words), sums of code words are received with symbol level synchronization wherein, to further improve robustness in comparison to the first embodiment, a linear code is utilized for additional encoding of the HD code words. Linear codes have the property that any linear combination of code words taken from a linear code is again an element of the same code. The present embodiment exploits that property. Let $\mathcal{L}:F^d \to F^b$ be the encoding function of a linear code with code rate d/b and let $\mathcal{L}^{-1}:F^b \to F^d$ be the decoding function. Transmitter i sends the code word $x_i$ in form of an encoded code word $$z_i = \varepsilon_i(x_i) = \frac{1}{\hat{h}_i} v(\mathcal{L}(x_i)).$$

The decoded received signal can be written as $$\hat{u} = \mathcal{D}(y) = \mathcal{L}^{-1}(\chi(y))$$

where χ computes the input for the (linear code) decoder and may be hard or soft bits. If the code rate is chosen appropriately, û will approximate $u=\Sigma_{i=1,\ldots,n} x_i$ with high probability.

In a third embodiment, weighted sums of HD code words, additionally coded with a linear code, with symbol level synchronization, are decoded wherein there is no channel state information at the transmitters.

The third embodiment is a modification of the second embodiment for the case that no channel state information is available at the transmitters 101. Since in that case the transmitters cannot compensate the effect of the channel 103 by multiplication with $$\frac{1}{\hat{h}_i},$$

the received signal is distorted by the channel 103 and the receiver 104 can only decode a function $$u = \sum_{i=1,\ldots,n} a_i x_i,$$

with $\alpha_i \in F$. Transmitter i sends the code word $x_i$ in form of an encoded code word $\varepsilon_i(x_i)=v(\mathcal{L}(x_i))$ and the receiver applies the decoding $\mathcal{D}(\alpha y)=\mathcal{L}^{-1}(\chi(\alpha y))$. Here $\alpha \in \mathbb{R}$ is a parameter chosen by the receiver. Expressions whose coefficients $\alpha_i$ closely approximate the channel coefficients $\alpha h_i$ enable the receiver to reduce probability of error. Different coefficients can be chosen by scaling the received signal with different factors α. To determine a good scaling factor α and to compute the resulting equation coefficients $\alpha_i$, channel state information $h_i$ is required at the receiver 104.

It should be noted that the third embodiment can be applied at multiple receivers 104.

It should further be noted that if transmitter i has channel state information $\hat{h}_i$ it may use preprocessing to reduce the probability of error for desired coefficients. In that case the transmitter 101 can encode the HD code word to $\varepsilon_i(x_i)=\alpha_i v(\mathcal{L}(x_i))$, where $\alpha_i$ depends on the channel state information and the desired coefficients.

In a fourth embodiment, sums of code words are decoded with coarse synchronization. The present embodiment enables a single receiver 104 to decode sums of code words $u=\Sigma_i x_i$ without requiring tight synchronization.

Figure 3:
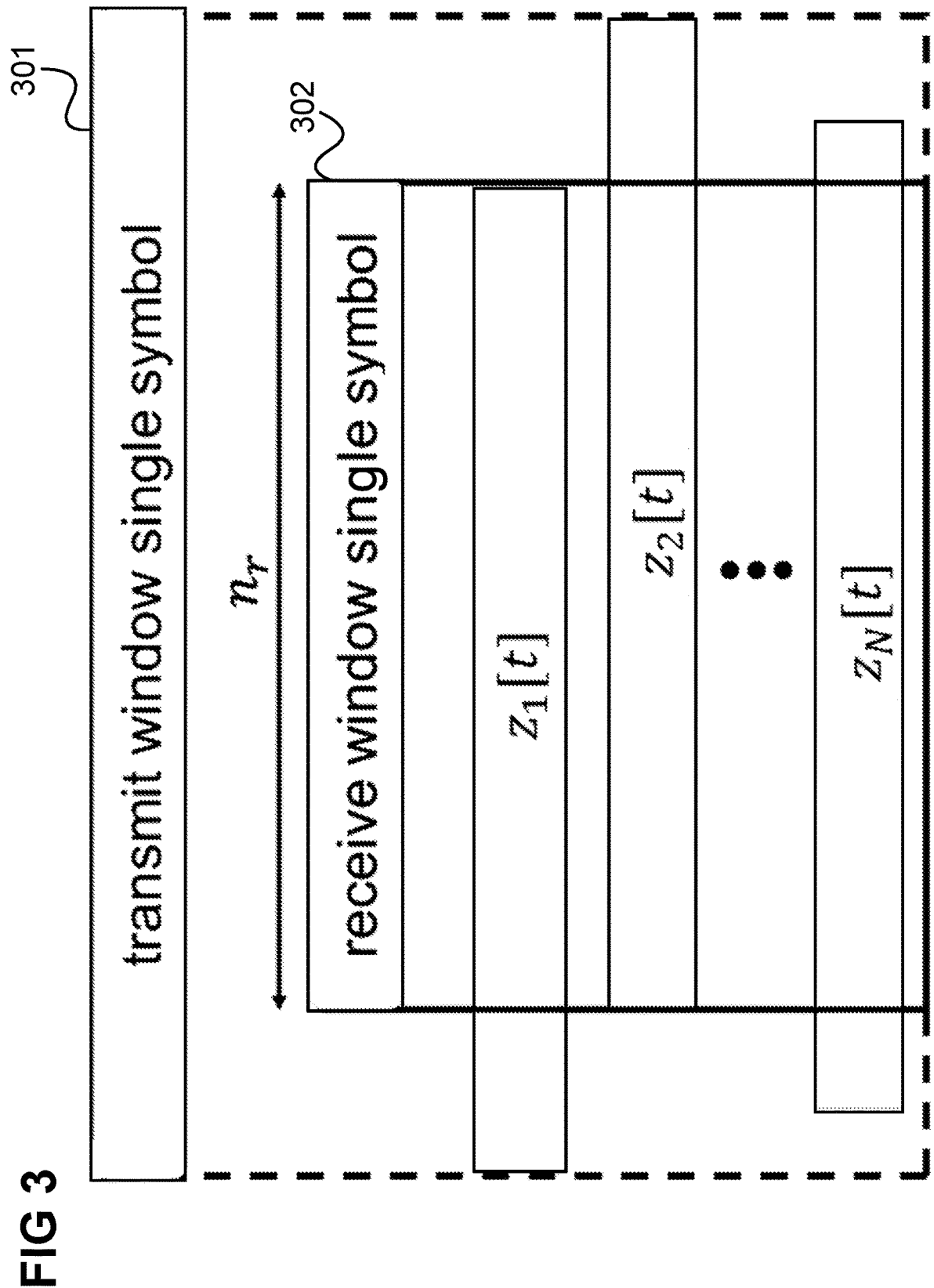
FIG. 3 illustrates a coarse synchronization of symbols of transmit signals $z_i$ within a symbol transmit window.

FIG. 3 illustrates a coarse synchronization of symbols of transmit signals $z_i$ within a symbol transmit window 301.

According to the present embodiment, to relax synchronization requirements for each code word symbol $x_{ik}$ all transmitters 101 simultaneously transmit short bursts of sequences with length $n_r$. The receivers 104 measure the received power over a specified receive window 302 of length $n_r \cdot n_t$. Data is encoded in the power of the transmit sequence as follows.

Each symbol $x_{ik}$ is modulated by a short sequence $b_i$ of length $n_r$. The sequence is designed such that it has the following properties:

1) Any subset of $n_r$ samples of $b_i$ has approximately unit power, $\Sigma_{k=1}^{n_r}|b_{ik}|^2 \approx 1$.
2) Sequences form different transmitters are approximately orthogonal, $\Sigma_{k=1}^{n_r} b_{ik} b_{jk} \approx 0$, for all i≠j.

Moreover, to cancel the impact of the channel 103, each transmitter i is assumed to have knowledge of its own channel coefficient $h_i$. The k-th encoded HD code word symbol of transmitter i is given by a $n_r$ dimensional vector $z_{ik}=\varepsilon_i(x_{ik})=b_i\sqrt{x_{ik}}/h_i$. The receiver 104 observes a receive sample sequence of length $n_r \cdot n_t$ and calculates the power of the received signal as $u_j[t]=|\Sigma_{k=1}^{n_r} y_{jk}[t]|^2 \approx \Sigma_i x_i[t]+\sigma$ where σ is residual noise which is assumed to be approximately known and can be subtracted.

In a fifth embodiment, general functions of code words of the form $u_j=f(x_1,\ldots,x_N)=\psi(\Sigma_{i=1,\ldots,n}\xi_i(x_i))$ are calculated by modifying the first to fourth embodiment as follows. At the transmitter i the to the encoder $\varepsilon_i$ is given by: $\xi(x_i)$. At the receiver the output of the decoder is given by $\psi(\mathcal{D}(y))$. An example for ψ is to map into log scale for further processing.

More complex computations are also possible. For instance, in a sixth embodiment, each transmitters 101 encodes its data to be sent to create a small fraction of representative "coded data" by taking random linear combinations of its data. So, each transmitter 101 creates m coded samples by multiplying its data set by a random (Gaussian or Bernoulli) matrix $G_i$ times $X_i$, where $G_i$ is an m×n matrix.

The receiver 104 observes $Y=[G_1 \ G_2 \ldots G_N][X_1 \ldots X_N]^T$. It can be shown that such sums are sufficient to preserve the second order statistics of the data, that is expectation over $E(Y^TY)=E(X^TG^TGX) \approx E(X^TX)$ as $G^TG \approx I$ by the weak law of large numbers. The second order statistics are useful in developing an LMMSE (minimum mean square error estimator) for determining a fit to the data. This form of coding can readily be applied in HD space via kernel embeddings of the data, as well as applied to different data sizes at each device.

The approaches described herein can also be applied to transmit HD encoded data that has been generated by binding. In that case the HD code word is given by $X_i = \alpha_i \otimes b_i$.

After decoding the result of a function u the receiver 104 can combine it by binding with another HD vector according to $u \otimes b$.

The calculation of a function over-the-air as described above, in particular the sum as in the first embodiment described above, can be used for training a HD-computing based classifier in a distributed manner. This is done by superposition of HD code words from the same class. Let $\phi(s^{(i)}) = x^{(i)}$ be an HD code word from class $C_i$. A classifier for that class can be trained by computing the superposition $u_i = \Sigma_{x \in c_i} x$. This can be done by that each transmitter 101 sends a HD code word of the class $C_i$. For example, for training an image classificator, each transmitter 101 may take an image of an object of the class $C_i$ and the transmitters 101 send the images encoded to HD code words such that the receiver 104 receives $u_i = \Sigma_{x \in c_i} x$. This can be done for multiple classes and classification of a HD code word (of unknown class) can be done by correlating (e.g. inner product multiplication) of the HD code word with each $u_i$ (referred to as prototype class vector) and selecting the class for which the inner product with $u_i$ has a maximum. In that manner, the first to fourth embodiments can be used to train a classifier in distributed fashion by transmitting code words form the same class simultaneously to a receiver 104.

A analogous approach may also be used for inference, as illustrated in FIG. 0.4.

Figure 4:
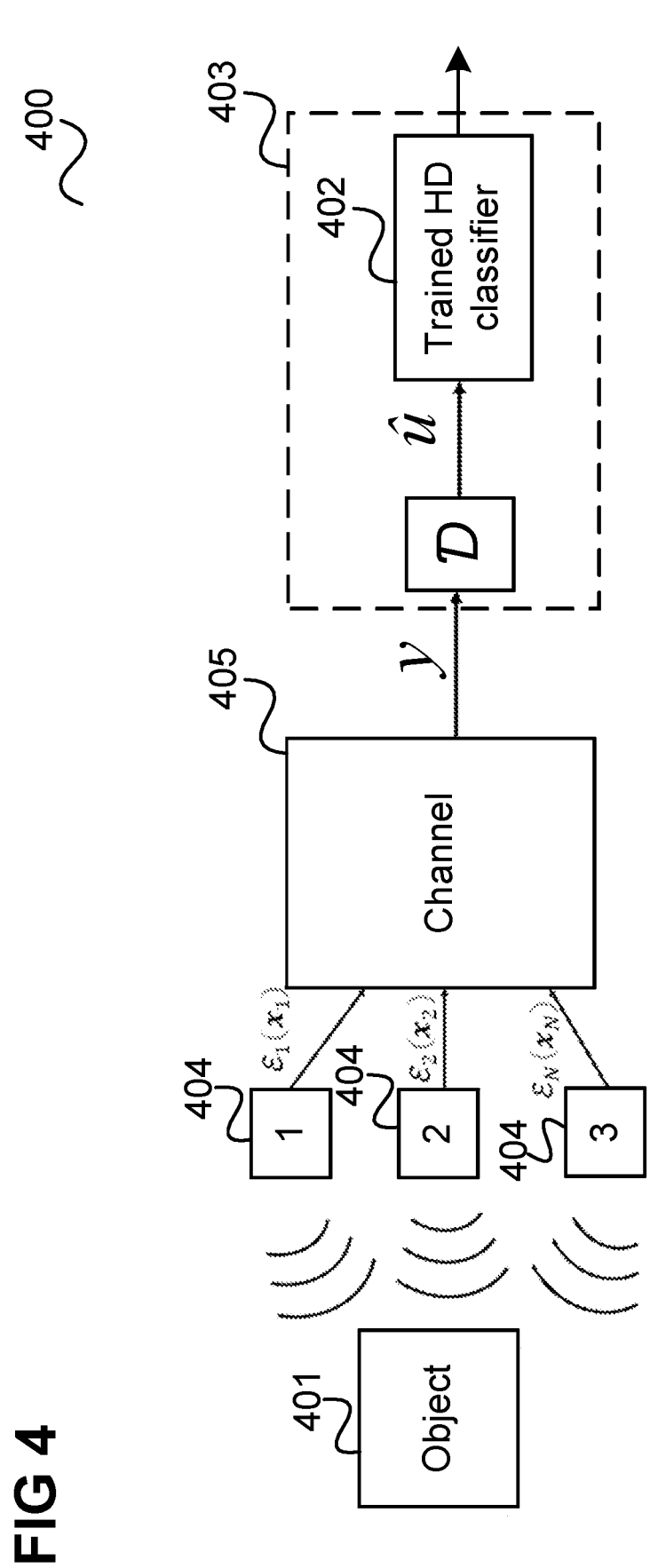
FIG. 4 shows a communication system for classifying an object.

FIG. 4 shows a communication system 400 for classifying an object 401.

Given a trained classifier (e.g. trained in the above manner) a receiver 403 (corresponding to receiver 104) may receive a superposition of HD code words sent by transmitters 404 (corresponding to transmitters 101) via a channel 405 (corresponding to channel 103) as in the first to fourth embodiments described above and calculate the inner product between the received superposition and each of multiple prototype class vectors. As explained above, the output of the classifier 402 is then given by the argmax over the inner products (i.e. the class for which the inner product gives has a maximum).

In the embodiments described above, it was assumed that there are a plurality of transmitters 101 and it was exploited that there is a superposition of the code words 102 when transmitting them over the wireless channel 103. In the following, there are not necessarily a plurality of communication devices and approaches for efficient and robust communication of HD encoded data are described to enable robust HD computing for wireless communication systems.

In particular, according to various embodiments, HD code words are compressed to increase efficiency of the usage of communication resources (e.g. spectral efficiency). According to various embodiments, the importance of information is taken into account in encoding and compression. For example, different pieces of information may have different importance for the end user, e.g. the exact price in a bill is more important than other information or the details of certain part of a picture is more important than others (e.g., the part containing a human face).

In the following, an example implementation of HD coding is described that utilizes random embeddings. A transmitter 101 may use this approach to encode sensor data to HD code words. It should be noted that there is an ever-growing number of implementations of HD computing architectures that utilize random and deterministic architectures. The embodiments described herein are generally agnostic to the specific HD computing architecture and can be adapted for different architectures.

It is now assumed that there is a set S of possible source data elements (i.e. messages, e.g. S possible sensor values, like temperatures) that a transmitter 101 may want to communicate to the receiver 104 through the wireless channel 103. For each source data element, a random HD code word words of a certain length d is sampled independently from the same probability distribution of code.

For transmitting a source data element (e.g. according to a temperature currently measured), the transmitter 101 encodes the source data element by the code word chosen for that source data element.

According to various embodiments, the probability distribution is a given sub-Gaussian distribution (i.e. a probability distribution whose tails decay at least as fast as a Gaussian distribution). For example, the probability distribution is a uniform distribution over the alphabet $A=\{+1, -1\}$. By Hoeffding's inequality, the cross-correlation (inner product) between two different code words is probabilistically small, and the probability decays exponentially with the code length d:

$$Pr(|\langle \phi(a), \phi(b) \rangle| \geq \mu d) \leq \exp\left(-\frac{\mu^2 d}{2}\right) \tag{1}$$

Where Pr(.) denotes probability, $\alpha, b \in S$, $\phi$ is the HD encoding mapping, $\langle \phi(\alpha), \phi(b) \rangle := \Sigma_{i=1}^{d} [\phi(\alpha)]_i \cdot [\phi(b)]_i$ is the inner product, and $\mu < 1$ is a parameter controlling the targeted cross-correlation. The autocorrelation of any code word, however, is a constant d.

After encoding a data element $\alpha \in S$ into an HD code word $x = \phi(\alpha)$, the transmitter 101 sends x the wireless channel 103. This leads to possible transmission errors which may modify some symbols of the HD code word. For example, a symbol+1 may become −1 after transmission. The receiver 104 receives the code word as received code word y (the mapping to constellation symbols and corresponding decoding are here omitted). If errors do not happen at too many places, e.g., with a probability $$q < \frac{1}{2},$$

then it still holds that $\langle \phi(\alpha), y \rangle > \langle \phi(b), y \rangle$ with high probability (by setting $$\mu < \frac{1}{2} - q$$

and make d large enough in equation (1), when the alphabet A={+1, −1}). If it holds that the probability $$q > \frac{1}{2},$$

the receiver 101 can pre-process the received code word, e.g., flip all the symbols in the case A={+1, −1}.

The receiver 104 can then compare the inner products of the received code word and all code words that were chosen for the source data elements of the set S and select the code word which gives the highest inner product. The receiver 104 then assumes that the transmitter 101 has transmitted the source data element that belongs to this selected code word (i.e. for which this selected code word has been chosen).

The receiver 104 may thus determine the correct source data element sent with high probability if the encoding length d is large enough and the probability of error is exponentially decreasing as the code word length increases.

In the following, various embodiments for transmission of data using HD encodings from at transmitter 101 to a receiver 104, in particular providing a type of source-coding, are described. These embodiments may also be used in combination. According to a first embodiment, a receiver is provided which makes use of the fact that an inner product can be performed iteratively. This is illustrated in FIG. 5.

Figure 5:
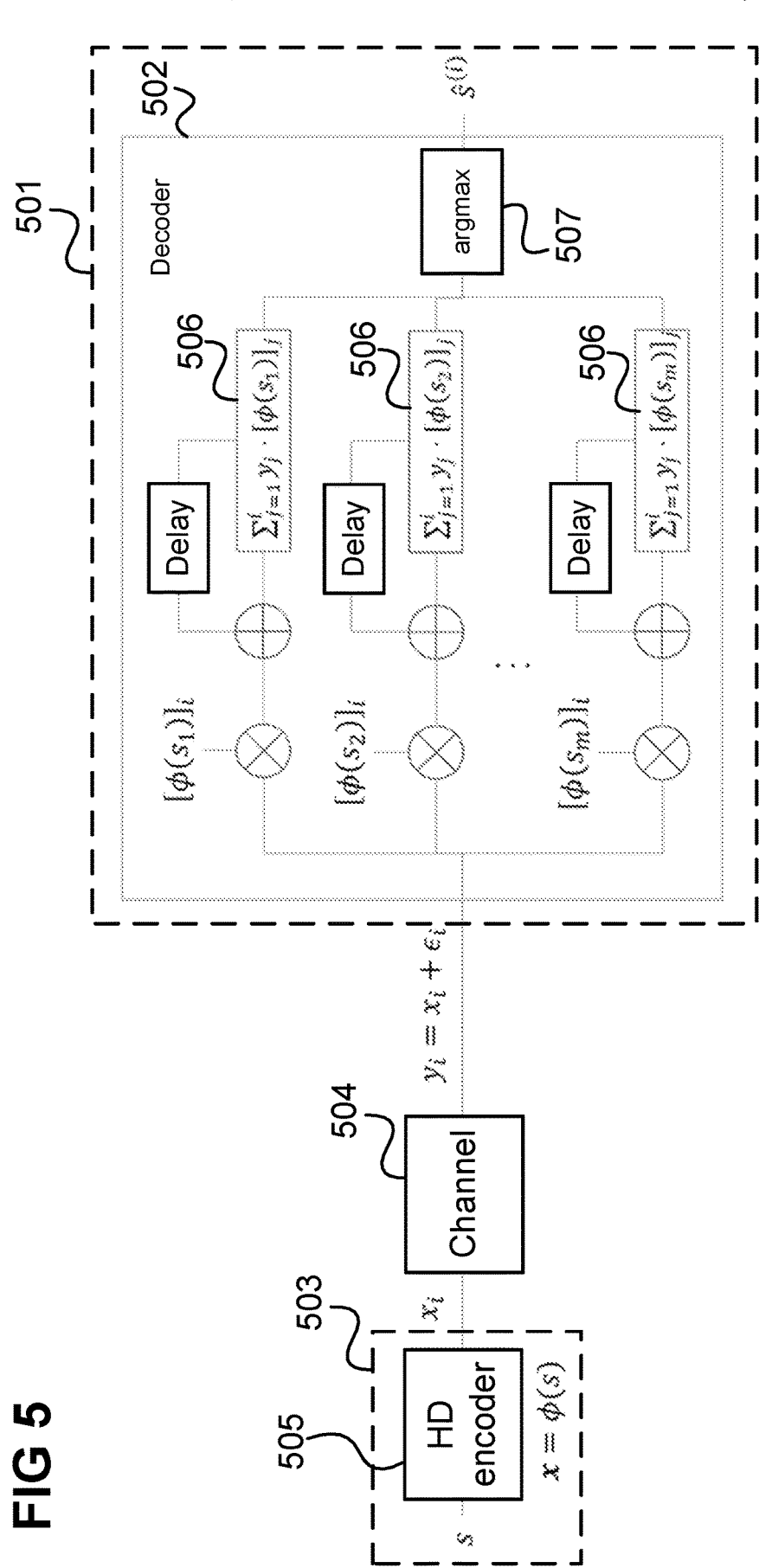
FIG. 5 shows a communication system for transmitting HD code words.

FIG. 5 shows a communication system 500.

A receiver 501 (for example corresponding to the receiver 104) includes a decoder 502 for decoding code words received from a transmitter 503 (corresponding to a transmitter 101) via a communication channel 504 (corresponding to the communication channel 103).

It is assumed that the set of possible source data words (i.e. possible data messages) consists of m distinct messages $\{s_1, s_2, \ldots, s_m\}$. A data element s E S first goes through the HD encoding process implemented by an HD encoder 505 of the transmitter 503 to obtain a d-dimensional code word $x=\phi(s)$. The transmitter 503 or the receiver 501 may determine d by the targeted reliability of transmission of the source data element and the error probability of the channel, and it is pre-communicated between the transmitter 503 and the receiver 501.

The transmitter 503 then transmits the code word $x=(x_1, \ldots, x_d)$ sequentially (symbol after symbol) through the channel, with possible errors $\epsilon_i$ added to each symbol $x_i$ ($\epsilon_i=0$ if no error happens).

The receiver receives, at each time step i a symbol $y_i=x_i+\epsilon_i$. (It should be noted that i is now used as symbol index instead of as transmitter index because only one transmitter is considered).

The selection of code words (e.g., generated according to a random seed) for the set of data elements S is pre-communicated between the transmitter 503 and the receiver 501, e.g., through a control channel (for example by signaling an indication (e.g. index) of the random seed used for a (pseudo-)random sampling process), and the codebook can also change (according to a rule agreed on between both sides) after each round of communication (in particular when d is adapted after a code word). The decoder uses the code words of all m messages to perform decoding as follows:

At each time step i, the decoder 502 computes the (partial) inner product of the code word $\phi(\alpha)$ for each $\alpha \in S = \{s_1, s_2, \ldots, s_m\}$ and the received code word y up to the i-th symbol. The decoder 502 does this recursively by adding $y_i \cdot [\phi(\alpha)]_i$ to the result of previous time step, $\sum_{j=1}^{i-1} y_j \cdot [\phi(\alpha)]_j$, which it stores in a respective memory unit 506 and updates at each time step.

At each time step, a comparator 507 of the decoder compares all updated (partial) inner products and selects the data element of S giving the largest one (i.e. whose inner product with the received code word up to symbol i is highest). The decoder 502 outputs this selected data element as the estimated source message $\hat{s}^{(i)}$ for time step i.

Thus, the decoder 502 correlates the received code word symbol by symbol and outputs an estimate for the originally sent data element wherein over the time steps the estimate of the original data element s gets more and more reliable (and possibly also accurate).

The HD encoding and decoding approach described above can be used as a specific type of source-channel coding: depending on the importance of the source data element, the transmitter 503 or the receiver 501 may select a desired reliability and latency, and accordingly set the encoding length d. Upon receiving the first symbol of the code word, the receiver 501 starts to produce an estimate of the source data word (also referred to as source message), e.g. for an end application running on the receiver 501. The end application can flexibly trade off the desired level of reliability with the decoding latency, by selecting the time when the decoder 502 produces the estimated source message. The end application can also make use of the increasingly refined estimation of the source message that the decoder 502 produces over the time steps.

The receiver 501 as described above provides a decoder structure with low complexity and a uniform decoding for different coding length d. It allows low latency of the transmission (in particular the decoding) and a flexible trade-off of decoding quality vs. latency. The complexity of the decoder depends on the size of message set S. For a small set size, the decoder 502 may be constructed from a few simple computation and memory units.

According to a second embodiment, the transmitter 101 adds a compression after encoding data to be transmitted to a code word.

It should be noted that each HD vector (i.e. HD code word) may potentially represent an aggregate data structure by binding and bundling many different pieces of information together. A key property of HD encodings is that they encode a small amount of information in a large (hyper dimensional) vector space. This allows for efficient and robust implementation of basic computation and machine learning tasks. Typically, the HD encoding function $\phi(\bullet)$ is transparent to the transmitter 101. Based on the HD encoding function the transmitter 101 can selectively decide which elements of the HD encoded code word are relevant and adaptively compress the HD code word by using a suitable compression function $\psi: F^d \rightarrow F^b$, where b<<d and $\psi$ depends on the HD encoding function p.

Figure 6:
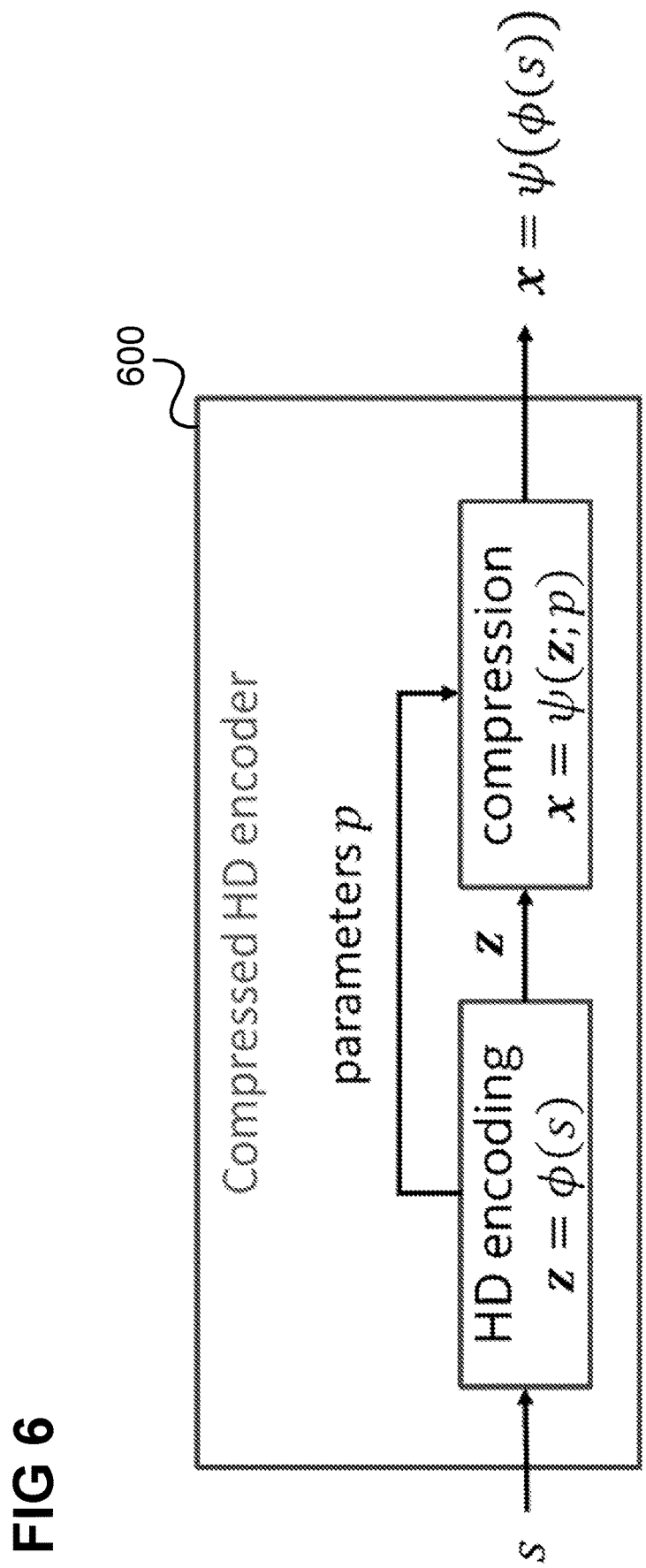
FIG. 6 shows a compressed HD encoder.

FIG. 6 shows a compressed HD encoder 600, which is for example part of a transmitter 101.

The HD encoder 600 performs HD encoding $\phi$ followed by a compression p resulting in a compressed HD code word $x=\psi(\phi)(s))$ which the transmitter 101 may then send to the receiver 104.

The compression $\psi$ may depend on parameters p. The parameters p may indicate a selection or rank of the relevant elements of the HD code word $\phi(s)$. If the HD encoding function $\phi$ is given by a linear transformation, p may for example describe the dominant Eigenvectors of the encoding function $\phi$. The parameters p may also depend on the information content of the data input s. If the data word s contains more information the encoder 600 compresses the HD code word φ(s) less compressed which results in b being larger.

In some applications the HD encoding function φ may be unknown to the transmitter 101 or deriving a meaningful adaptive compression function from the HD encoding is not feasible. In that case the transmitter 101 can apply a non-adaptive compression function p that depends on the information content of the data s. An example for a non-adaptive compression that depends on the information content of s is a random compression with a d×b random matrix where b is based on the information content included in s.

Figure 7:
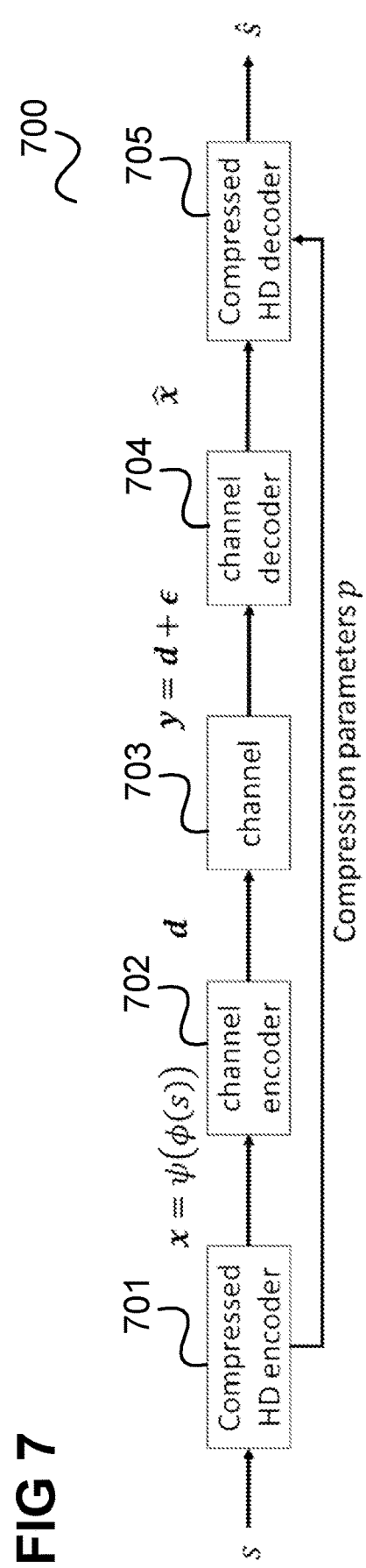
FIG. 7 shows a flow diagram depicting a flow to transmit and decode compressed HD vectors.

FIG. 7 shows a flow diagram 700 depicting a flow to reliably communicate and decode compressed HD vectors.

A compressed HD encoder 701 corresponding to the compressed HD encoder produces a compressed HD code word $x=\psi(\phi(s))$.

Before transmitting the compressed HD code word $x=\psi(\phi(s))$ (or also $x=\phi(s)$ if no compression is used) over a channel 703, a channel encoder 702 of the transmitter 101 may encode it with a suitable channel code with a code rate chosen to match the channel conditions. See also the third embodiment described below for a further discussion of optimization of channel coding. The receiver 104 includes a corresponding channel decoder 704.

To estimate the original HD code word φ(s) the receiver 104 applies a decompression (i.e. recovery algorithm) $\psi^{-1}$ implemented by a compressed HD decoder 705. The decompression can be implemented in various ways. Examples include simple linear mappings, convex optimization, and efficient trained AI algorithms. The decompression may be optimized based on the compression function φ and also depends on the parameters p. For this, the transmitter 101 communicates the parameters p to the receiver 104.

The receiver may be interested in decoding the original s. In that case the compressed HD decoder 705 directly performs the decoding for the HD encoding.

In another example the receiver 104 does not immediately decode HD code words.

Figure 8:
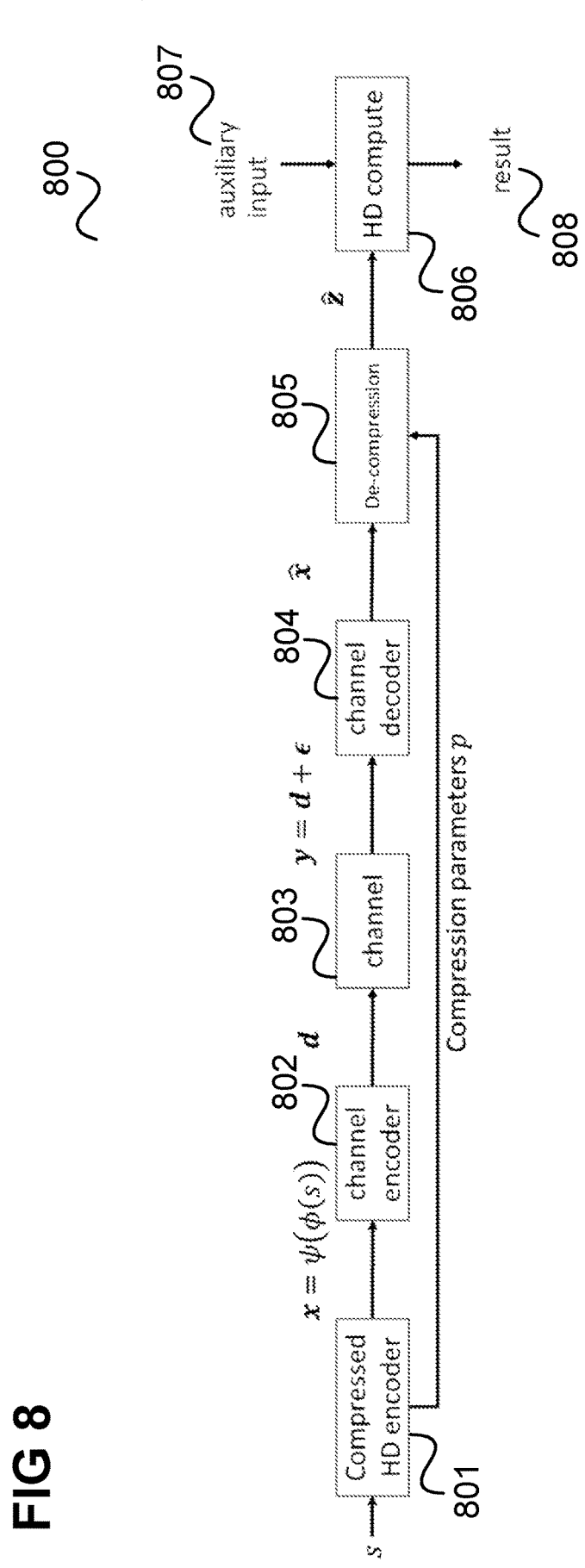
FIG. 8 shows a flow diagram depicting a flow to communicate compressed HD vectors with computation on HD encoded data.

FIG. 8 shows a flow diagram 800 depicting a flow to communicate compressed HD vectors with computation 806 on the HD encoded data.

As in the example of FIG. 7, the receiver 101 includes a compressed HD encoder 801 and a channel encoder 802, transmits over a channel 803 and the receiver includes a corresponding channel decoder 804, but there is no compressed HD decoder but only a HD decompression 805. The receiver operates directly on the HD code word, e.g. using some auxiliary input 807 and outputs a HD computing result 808.

For example, the auxiliary input 807 includes one or more previously received HD code words such that the result 808 may be result of binding or bundling of multiple HD code words. In another example the auxiliary input 807 may be a trained HD classifier used to perform a classification of the recently received code word.

According to a third embodiment, the transmitter 101 uses semantic aware adaptive coding (and optionally also compression) and unequal error protection for HD code words.

Given that HD encoding gives inherent robustness to errors, typical channel coding strategies may be adapted to augment or supplement the level of protection against channel errors. The coding level may be adapted to the dimension of the HD vector as presumably the higher the dimension the more robust the HD vector will be to channel errors. However, it should be noted each HD vector could potentially represent an aggregate data structure by binding and bundling many different pieces of information together. Hence, while the HD vector may be of high dimension, its capacity may be limited by the amount of information it carries. Therefore, according to the present embodiment, the transmitter 101 adapts the level of protection offered by channel coding to the semantics of the information carried by the HD vector. On the other hand, the transmitter 101 may increase the dimensionality d of the HD representation may to accommodate more semantic information.

According to various embodiments, the transmitter 101 therefore adapts the channel coding and HD dimensionality jointly based on the channel conditions as well as level of semantic information carried by the HD vector. If the channel coding operation is computationally expensive (or requires a very high coding level), as well as the semantic information is dense the transmitter may increase the HD dimension d. On the other hand, it may decrease the HD dimension for a HD vector which carries low semantic information and channel conditions of the communication channel 103 are good.

The semantic information that is carried by the HD vector may also depend on the HD decoding/analytics task that may be adapted dynamically as well. For example, an object recognition task such as face detection may lead to further analytics that may be performed on the HD vector.

Figure 9:
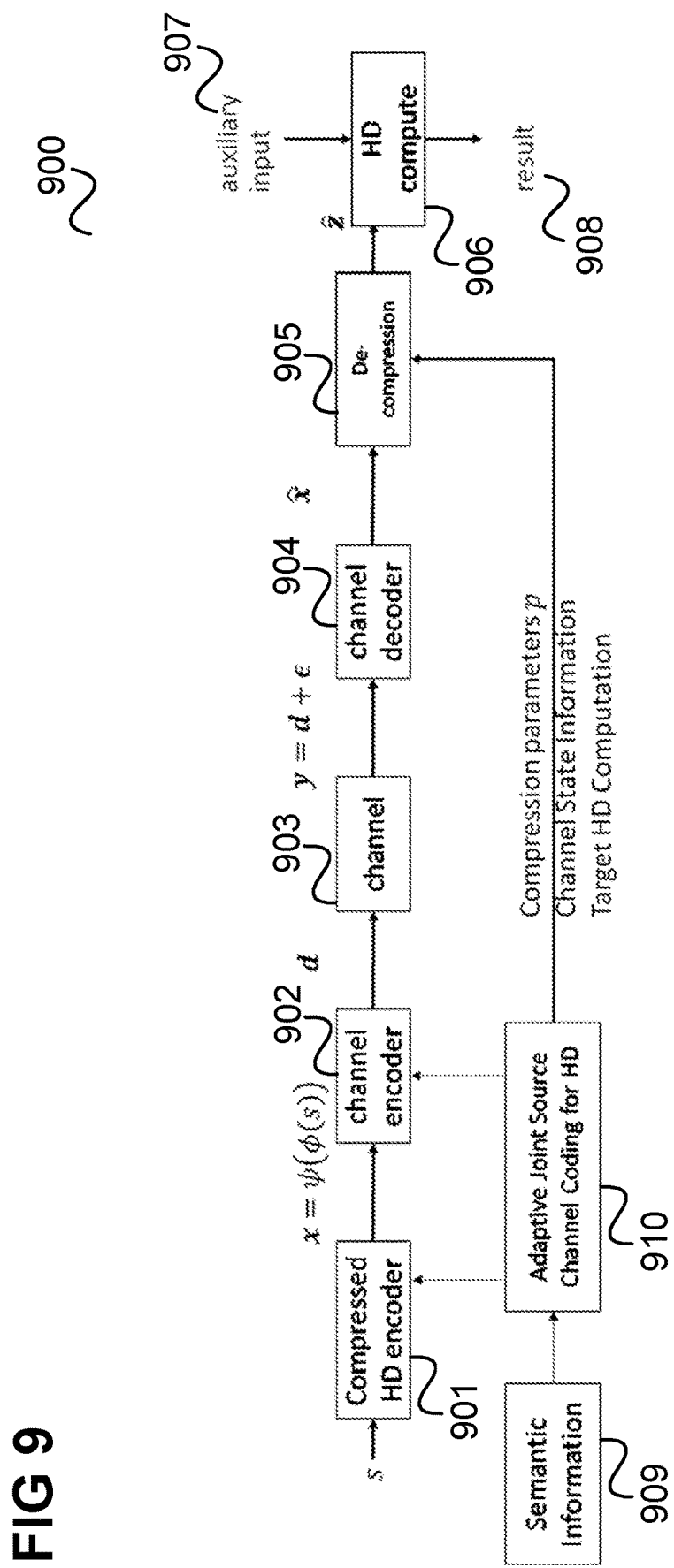
FIG. 9 shows a flow diagram depicting a flow for semantics aware adaptive coding, compression and unequal error protection for HD representations.

FIG. 9 shows a flow diagram 900 depicting a flow for semantics aware adaptive coding, compression and unequal error protection for HD representations.

As in the example of FIG. 8, the receiver 101 includes a compressed HD encoder 901 and a channel encoder 902, transmits over a channel 903 and the receiver includes a corresponding channel decoder 904. In this example, there is no compressed HD decoder but only a HD decompression 905. The receiver operates directly on the HD code word, e.g. using some auxiliary input 907 and outputs a HD computing result 908.

The encoding and compression carried out by the compressed HD encoder 901 as well as the channel encoding carried out by the channel encoder 802 are based on the amount of semantic information 909 carried by the code word s. An encoding an compression controller controls the HD encoding, compression and channel encoding in accordance with the amount of semantic information 909.

Furthermore, the transmitter 101 may apply unequal error protection to parts of the HD vector. For example, in correlative encoding, the transmitter 101 may lift certain parts of the HD vectors to maintain correlation across the vectors. This correlation may be better preserved by adding more redundancy for this part of the HD representation.

In some scenarios, the transmitter 101 may keep the HD dimension fixed for consistency in combining HD representations across different sources (e.g., in federated learning). In this situation, the transmitter 101 may adapt the channel code according to the fixed HD dimension and the level of semantic information.

Other variations may be included when encoding non-binary HD representations. Standard coding tricks such as preserving most significant bits of the HD encoded vector values still apply.

The transmitter may add signaling to indicate the HD dimension if it is adapted dynamically. Furthermore, dynamic compression of HD vectors is possible by randomly dropping bits from the HD vectors.

Exemplary applications for the above embodiments for transmission of data by means of HD encodings are:

Sensing and real-time status tracking: in some applications, a sensor is deployed in the field and periodically/ non-periodically transmits back certain sensing results or its status update to the control center, over a wireless channel. The control center monitors the results or status in real time, e.g., to make certain time-critical decisions. Sometimes an early but inaccurate estimate of the result/status is useful in early decision making, which can then be adjusted over time, when more accurate estimation is available later. Similar situations may also exist in autonomous driving, e.g., to avoid crashing, etc.

Information with differentiated quality for human consumption: sometimes the information produced at the source has different importance which warrants differentiated treatment (e.g., quality of service). Such scenarios could exist if the information is for human's consumption at the receiver side, where the experience of an end user may be affected more by some pieces of information than the others. For example, when a human is watching an image/video, the area where the human's eyes are focusing needs higher resolution than the surrounding areas. In such cases, the desired effect can be achieved by using a different encoding length d for different elements in the image/video, and bandwidth resource can be saved by such differentiated encoding.

Similarly, there could be a need for a flexible trade-off between latency and decoding quality if the information is for human's consumption, considering characteristics of human's brain and physiology/psychology. For example, when watching a live video, long delay and frequent pausing is intolerable. Sometimes the watcher would prefer to have some lower quality (but not too low) video frames but need a smoother flow. This trade-off can be achieved by tuning the encoding length d. When the quality of the wireless channel fluctuates, the encoding length can also adapt accordingly to give the end user the best experience.

Figure 10:
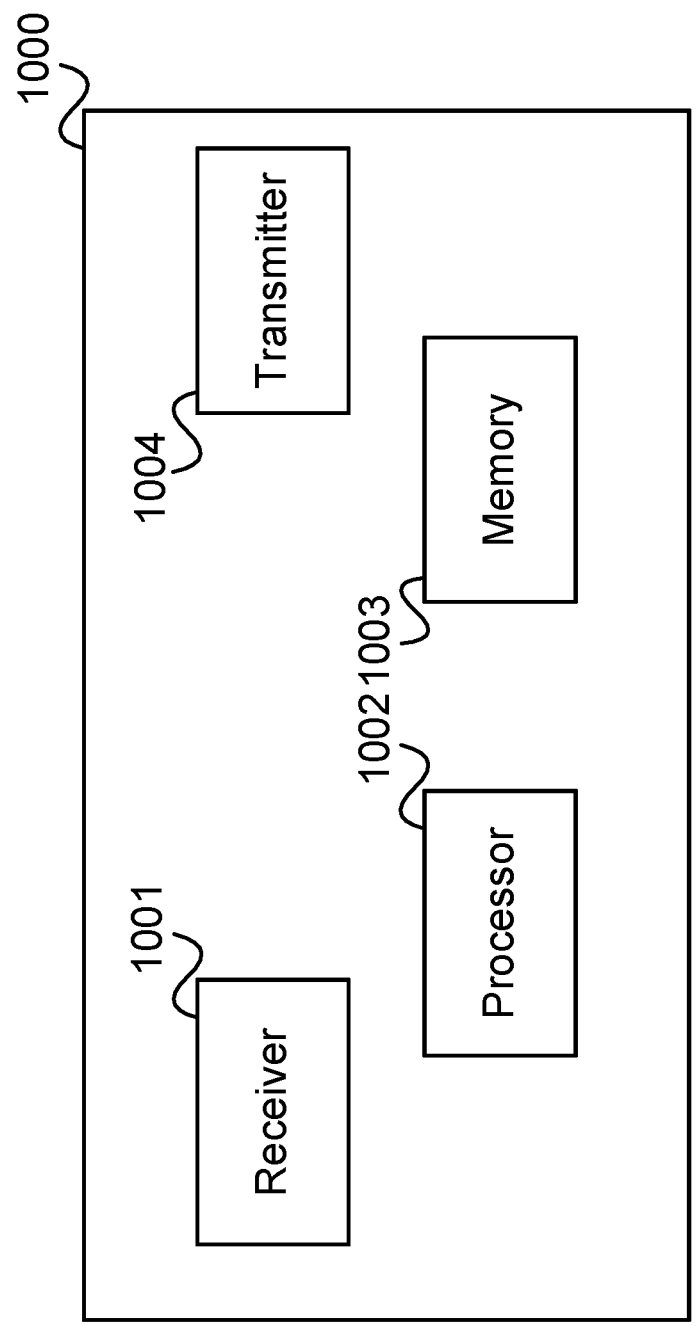
FIG. 10 shows a communication device according to an embodiment.
Figure 11:
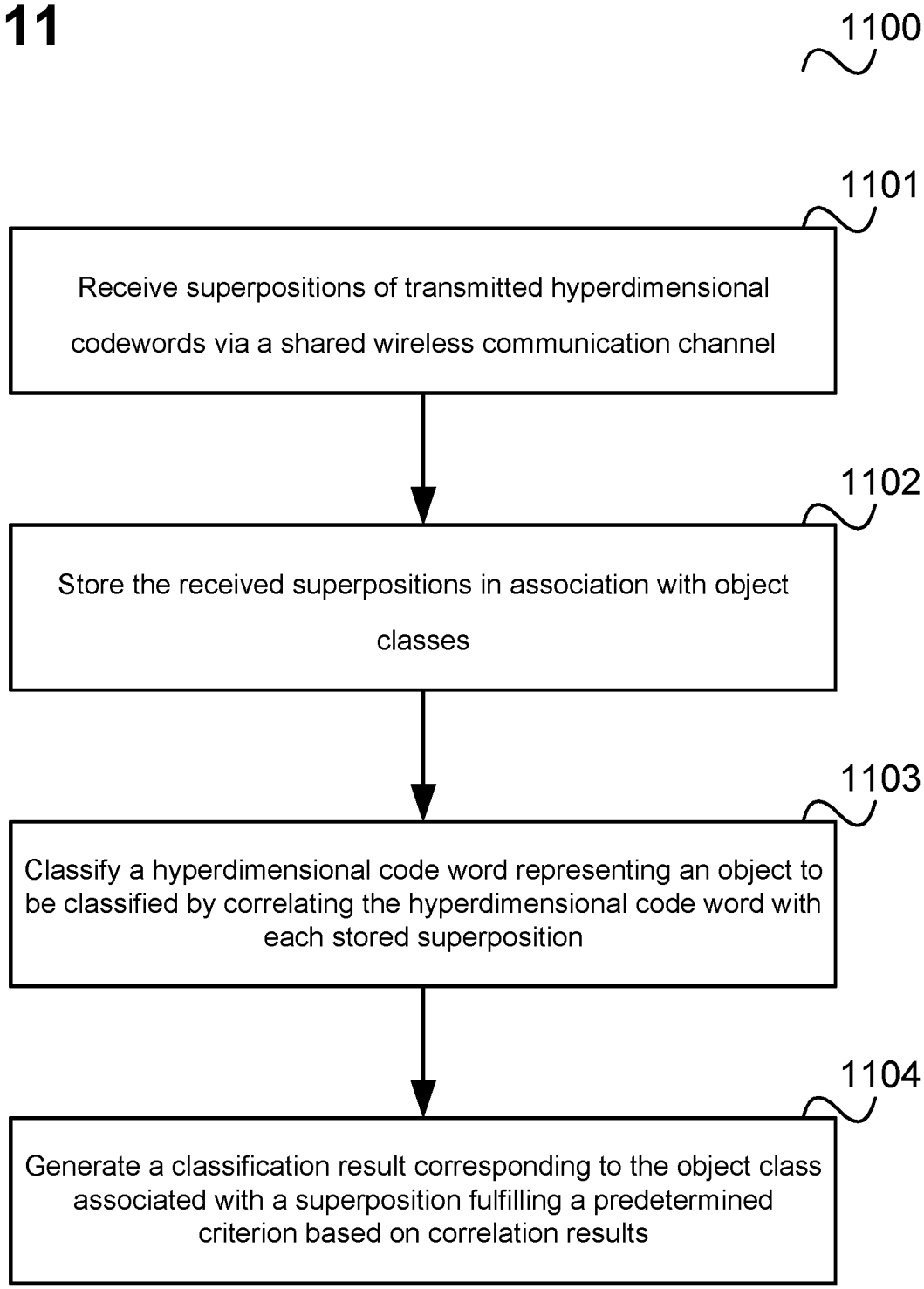
FIG. 11 shows a flow diagram illustrating a method for classifying an object according to an embodiment.

According to various embodiments, a communication device (e.g. part of a communication system) is provided as illustrated in FIG. 10.

FIG. 10 shows a communication device 1000 according to an embodiment.

The communication device 1000 includes a receiver 1001 and/or a transmitter 1004 and a processor 1002. It may further include a memory 1003.

According to one embodiment, the receiver 1001 is configured to receive, for each of a plurality of object classes, via a wireless communication channel shared among transmitters of a respective set of transmitters, a superposition of transmitted hyperdimensional code words, including, for each transmitter of the respective set of transmitters, a hyperdimensional code word transmitted via the wireless communication channel and encoding input data (e.g. sensor, or receiver, or transceiver) of an object of the object class acquired by the transmitter, the storage element or memory 1003 is configured to store, for each of the plurality of object classes, the received superposition in association with the class and the processor 1002 is configured to classify a hyperdimensional code word representing an object to be classified by correlating the hyperdimensional code word with each stored superposition and to generate a classification result corresponding to the object class associated with a superposition fulfilling a predetermined criterion based on correlation results (i.e. based on the results of the correlating of the hyperdimensional code word with each stored superposition).

According to various embodiments, in other words, a data processing device uses the superposition of HD code words which occurs when they are simultaneously (or at least overlapping) transmitted via a joint communication channel for training a classifier.

It should be noted that this may in particular be used for federated learning. In that case, the transmitters train their local HD based classifier (each class in the HD based classifier is given by an HD vector) and then send the trained classifiers through the wireless communication channel. Here the transmitters are coordinating to ensure that HD vectors from the same class are combined (superimposed) in the wireless communication channel. So, in that case, the hyperdimensional code word sent by each transmitter is itself a hyperdimensional code word generated by the transmitter (and can be seen to encode data about an "ideal" object of the respective object class).

A superposition (or hyperdimensional vector) fulfilling a predetermined criterion based on correlation results may mean that that the superposition (or hyperdimensional vector) fulfilling the predetermined criterion is the superposition (or hyperdimensional vector) which gives a maximum correlation result. In other words, an optimal correlation result is a maximum value, which may be determined or achieved by having a highest value (e.g. above certain threshold).

According to one embodiment, the receiver 1001 is configured to receive, from a plurality of transmitters, via a wireless communication channel, a superposition of transmitted hyperdimensional code words, including, for each transmitter of the plurality of transmitters, a hyperdimensional code word transmitted via the wireless communication channel encoding (e.g. sensor) data of the same object and the processor 1002 is configured to implement a classification model or regression model, supply the received superposition to the classification model or regression model and to determine a characteristic of the object from an output of the classification model or regression model in response to being supplied with the received superposition.

According to various embodiments, in other words, a processing device uses the superposition of HD code words which occurs when they are simultaneously (or at least overlapping) transmitted via a joint communication channel to reinforce the information about a (i.e. the same) object. It inputs this reinforced information to a model which performs classification or regression to determine information about the object like an object class or an object trajectory etc.

According to various embodiments, the receiver 1001 is configured to receive a sequence of symbols of a transmitted hyperdimensional code word and the processor 1002 is configured to correlate the received sequence of symbols with each of a plurality of candidate hyperdimensional code words, symbol-by-symbol, for each of the plurality of candidate hyperdimensional code words, aggregate, for each symbol of the sequence of symbols, the result of the correlation for the symbol with the results of the correlations for the previous symbols of the sequence of symbols, to generate a total correlation result for the symbol for the candidate hyperdimensional code word, output, if for a symbol a predetermined reliability criterion is fulfilled, a received source data element corresponding to the candidate hyperdimensional code word which gives a maximum total correlation result for the symbol or a received hyperdimensional code word corresponding to the candidate hyperdimensional code word which gives a maximum total correlation result for the symbol. In the receiver, for each candidate hyperdimensional code word the corresponding source data element may be stored and thus the processor may directly output the source data element corresponding to the candidate hyperdimensional code word which gives a maximum total correlation result for the symbol. Alternatively, the processor may output the hyperdimensional code word itself. The processor may further process the received hyperdimensional code word, e.g. performing bundling or binding or both with one or more other code words. In particular, outputting does not necessarily mean an output to an external device but may also be an output of an intermediate result (e.g. into a system memory) which is processed further. The processor may then output the result of the further processing to an external device.

According to various embodiments, in other words, a processing device determines partial correlations of a received code word with possibly transmitted code words until the reliability with which it has identified the transmitted code word from the partial correlation (up to the current symbol) is sufficient. This allows finding a balance between decoding latency and reliability. In some applications, latency is a more important issue (e.g., video conferencing) and it pays off to obtain an early but inaccurate estimation of source information that gets refined over time. Also, low complexity can be achieved which is a typical desired feature for decoders, especially for inexpensive and energy-constrained devices.

According to one embodiment, the processor 1002 is configured to code data to a hyperdimensional code word, determine an amount of information contained in the HD code word and compress the hyperdimensional code word depending on the amount of information contained in the hyperdimensional code word and the transmitter 1004 is configured to transmit the compressed code word.

According to various embodiments, a communication device compresses a hyperdimensional code word for transmission depending on its information content.

According to one embodiment, the processor 1002 is configured to determine an amount of information contained in a data word and code the data word to a hyperdimensional code word with a code length depending on the amount of information contained in the data word and the transmitter 1004 is configured to transmit the code word.

The amount of (e.g. semantic) information may be an input to the communication device from the outside.

According to various embodiments, a communication device selects the length of a hyperdimensional code word into which to encode data depending on the data's information content.

According to various embodiments, a communication system performs a method as illustrated in 11.

11 shows a flow diagram 1000 illustrating a method for classifying an object according to an embodiment.

In 1101, a communication device receives, for each of a plurality of object classes, via a wireless communication channel shared among transmitters of a respective set of transmitters, a superposition of transmitted hyperdimensional code words, including, for each transmitter of the respective set of transmitters, a hyperdimensional code word transmitted via the wireless communication channel and encoding (e.g. sensor) data of an object of the object class acquired by the transmitter.

In 1102, the communication device stores, for each of the plurality of object classes, the received superposition in association with the object class.

In 1103, the communication device classifies a hyperdimensional code word representing an object to be classified by correlating the hyperdimensional code word with each stored superposition and to generate a classification result corresponding to the object class associated with a superposition fulfilling a predetermined criterion based on correlation results.

Figure 12:
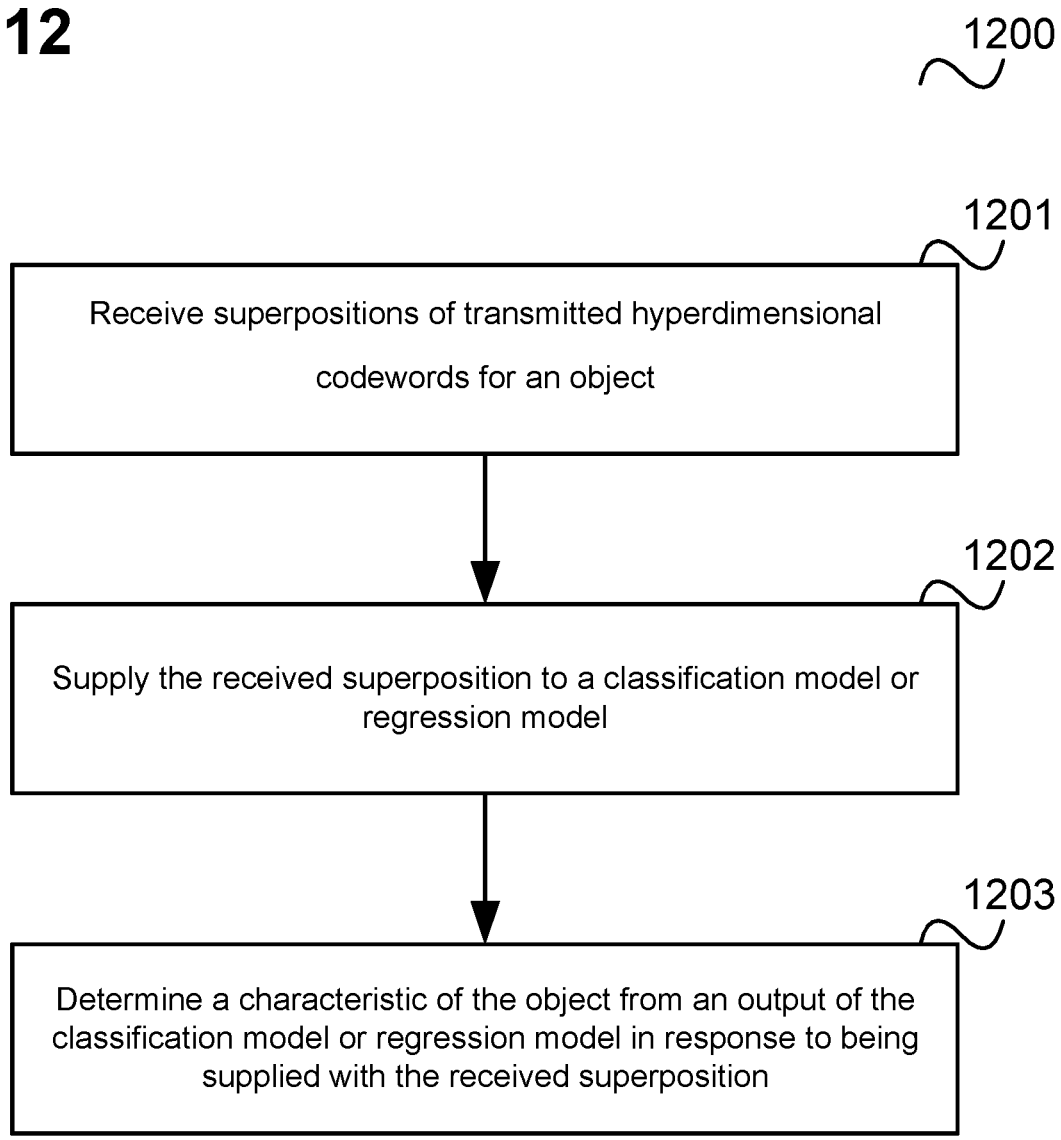
FIG. 12 shows a flow diagram illustrating a method for examining an object according to an embodiment.

According to various embodiments, a communication system performs a method as illustrated in FIG. 12.

FIG. 12 shows a flow diagram 1200 illustrating a method for examining an object according to an embodiment.

In 1201, a communication device receives, from a plurality of transmitters, via a wireless communication channel, a superposition of transmitted hyperdimensional code words, including, for each transmitter of the plurality of transmitters, a hyperdimensional code word transmitted via the wireless communication channel encoding (e.g. sensor) data of the same object.

In 1202, the communication device supplies the received superposition to a classification model or regression model; and determining a characteristic of the object from an output of the classification model or regression model in response to being supplied with the received superposition.

Figure 13:
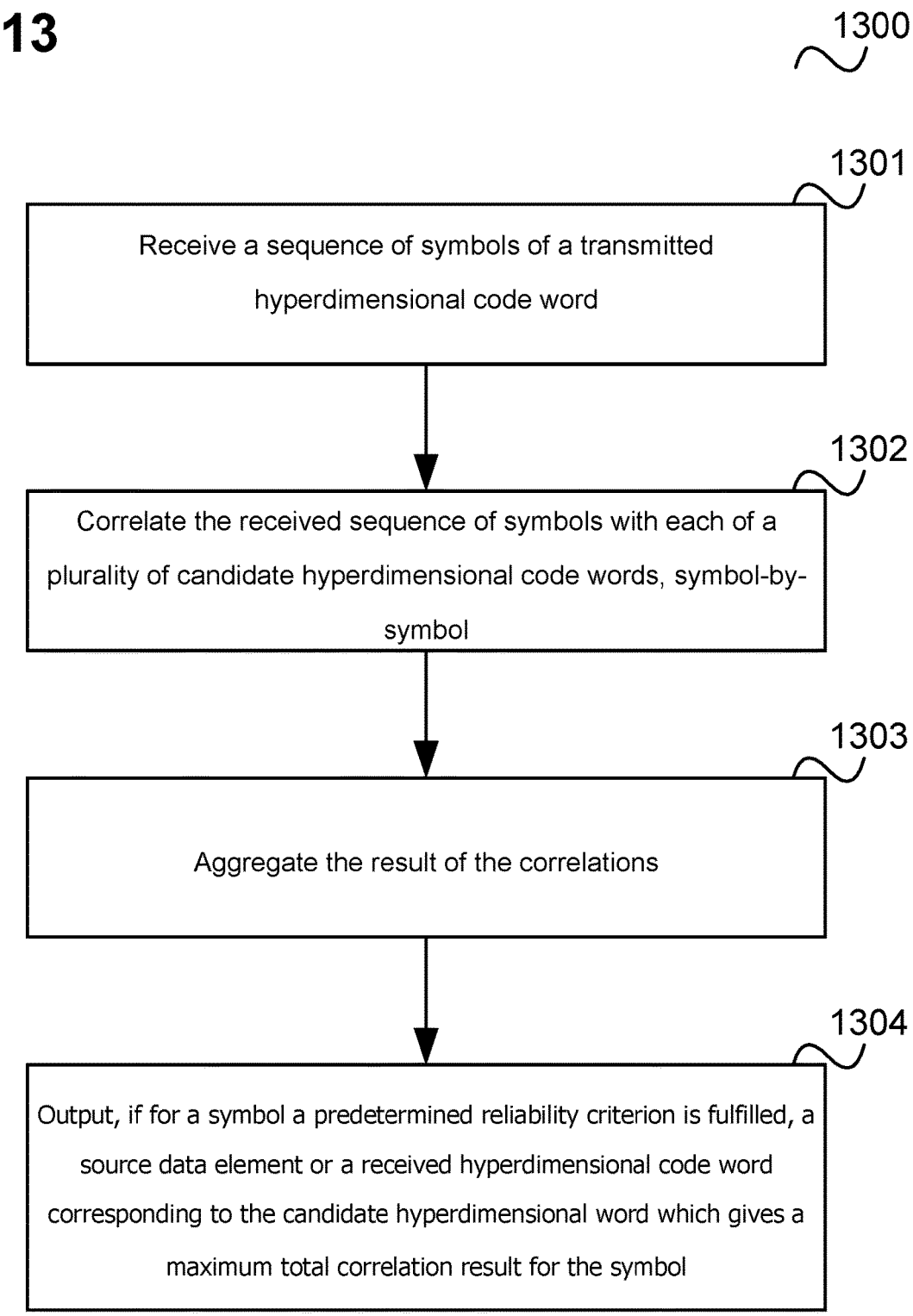
FIG. 13 shows a flow diagram illustrating a method for receiving data according to an embodiment.

According to various embodiments, a communication system performs a method as illustrated in FIG. 13.

FIG. 13 shows a flow diagram 1300 illustrating a method for receiving data according to an embodiment.

In 1301 a communication device receives a sequence of symbols of a transmitted hyperdimensional code word.

In 1302, the communication device correlates the received sequence of symbols with each of a plurality of candidate hyperdimensional code words, symbol-by-symbol.

In 1303, for each of the plurality of candidate hyperdimensional code words, the communication device aggregates, for each symbol of the sequence of symbols, the result of the correlation for the symbol with the results of the correlations for the previous symbols of the sequence of symbols, to generate a total correlation result for the symbol for the candidate hyperdimensional code word.

In 1304, the communication device outputs, if for a symbol a predetermined reliability criterion is fulfilled, a received source data element corresponding to the candidate hyperdimensional code word which gives a maximum total correlation result for the symbol, or the hyperdimensional code word itself. The communication device may further process the received hyperdimensional code word, e.g. performing bundling or binding or both with one or more other code words. In particular, outputting does not necessarily mean an output to an external device but may also be an output of an intermediate result (e.g. into a memory of the communication device) which is processed further. The communication device may then output the result of the further processing to an external device.

Figure 14:
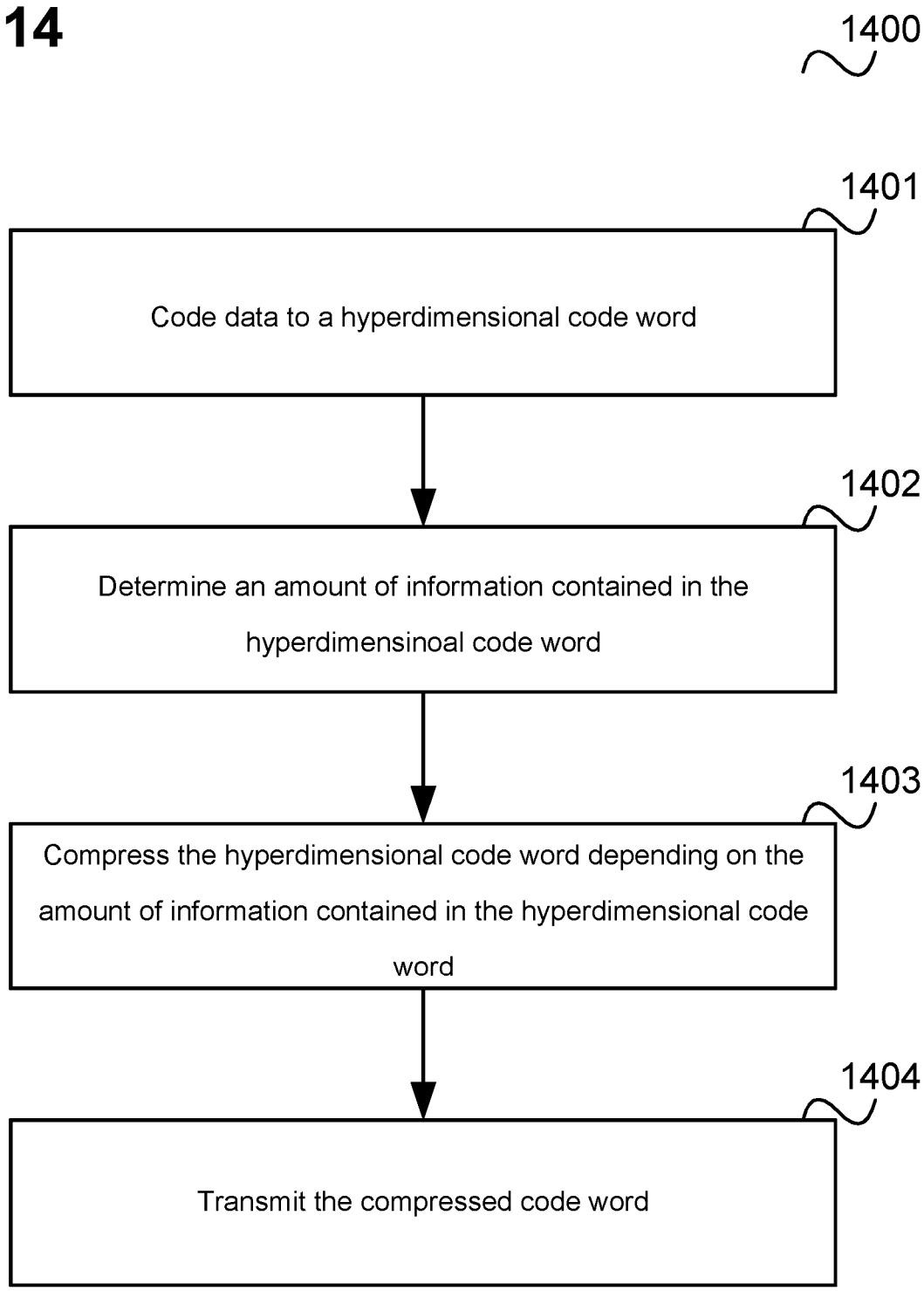
FIG. 14 shows a flow diagram illustrating a method for transmitting data according to an embodiment.

According to various embodiments, a communication system performs a method as illustrated in FIG. 14.

FIG. 14 shows a flow diagram 1400 illustrating a method for transmitting data according to an embodiment.

In 1401, a communication device codes data to a hyperdimensional code word.

In 1402, the communication device determines an amount of information contained in the HD code word.

In 1403, the communication device compresses the hyperdimensional code word depending on the amount of information contained in the hyperdimensional code word.

In 1404, the communication device transmits the compressed code word.

According to various embodiments, a communication system performs a method as illustrated in FIG. 15.

FIG. 15 shows a flow diagram 1500 illustrating a method for transmitting data according to an embodiment.

In 1501, a communication device determines an amount of information contained in a data word.

In 1502, the communication device codes the data word to a hyperdimensional code word with a code length depending on the amount of information contained in the data word.

In 1503, the communication device transmits the code word.

The components of the communication devices and communication systems may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The communication device may for example be at least partially implemented by a transceiver which may for example be at least partially implemented by a modem (e.g. an LTE or 5G modem), a baseband processor or other transceiver components or also by an application processor. The communication device may for example be a communication terminal as such and may include typical communication terminal devices such as a transceiver (including e.g. a baseband processor, one or more filters, transmit chains, receive chains, amplifiers etc.), an antenna, a subscriber identity module, an application processor, a memory etc.

The following examples pertain to further exemplary implementations.

Example 1a is a communication system including a receiver configured to receive, for each of a plurality of object classes, via a wireless communication channel shared among transmitters of a respective set of transmitters, a superposition of transmitted hyperdimensional code words, including, for each transmitter of the respective set of transmitters, a hyperdimensional code word transmitted via the wireless communication channel and encoding data of an object of the object class acquired by the transmitter, a memory configured to store, for each of the plurality of object classes, the received superposition in association with the class, a processor configured to classify a hyperdimensional code word representing an object to be classified by correlating the hyperdimensional code word with each stored superposition and to generate a classification result corresponding to the object class associated with a superposition fulfilling a predetermined criterion based on correlation results.

Example 2a is the communication system of Example 1a, wherein the processor is configured to correlate the hyperdimensional code word with the stored superposition by calculating an inner product with the stored superposition.

Example 3a is the communication system of Example 1a, wherein, for each object class, the superposition includes at least some transmitted hyperdimensional code words encoding data of the same object.

Example 4a is the communication system of Example 1a, including, for each object class, the set of transmitters, wherein the transmitters of the set of transmitters are configured to transmit the hyperdimensional code words to superimpose on the wireless communication channel.

Example 5a is the communication system of Example 4a, wherein the transmitter are configured to use the same spectral resources to transmit the hyperdimensional code words.

Example 6a is the communication system of Example 4a, wherein each transmitter is configured to scale the hyperdimensional code word it transmits to compensate a channel response between the transmitter and the receiver.

Example 7a is the communication system of Example 4a, wherein each transmitter is configured to encode the hyperdimensional code word according to a linear code and the receiver is configured to decode the received superposition according to the linear code.

Example 8a is the communication system of Example 7a, wherein the memory is configured to store the received superposition in decoded form.

Example 9a is the communication system of Example 4a, wherein each transmitter is configured to modulate the symbols of the hyperdimensional code word it transmits with a modulation sequence, wherein the modulations sequences of different transmitters of the set of transmitters are orthogonal and wherein the receiver is configured to observe, for each hyperdimensional code word symbol, a sequence of received symbols shorter than the modulation sequence and to estimate each symbol of the superposition of hyperdimensional code words from a power of a corresponding sequence of received symbols.

Example 10a is the communication system of Example 1a, wherein the predetermined criterion is that the superposition fulfilling the predetermined criterion is the superposition which gives a maximum correlation result.

Example 11a is a method for classifying an object including receiving, for each of a plurality of object classes, via a wireless communication channel shared among transmitters of a respective set of transmitters, a superposition of transmitted hyperdimensional code words, including, for each transmitter of the respective set of transmitters, a hyperdimensional code word transmitted via the wireless communication channel and encoding data of an object of the object class acquired by the transmitter, storing, for each of the plurality of object classes, the received superposition in association with the object class, classifying a hyperdimensional code word representing an object to be classified by correlating the hyperdimensional code word with each stored superposition and to generate a classification result corresponding to the object class associated with a superposition fulfilling a predetermined criterion based on correlation results.

Example 12a is the method of Example 11a, including transmitting the hyperdimensional code words to superimpose on the wireless communication channel.

Example 1b is a communication system including, a receiver configured to receive, from a plurality of transmitters, via a wireless communication channel, a superposition of transmitted hyperdimensional code words, including, for each transmitter of the plurality of transmitters, a hyperdimensional code word transmitted via the wireless communication channel encoding data of the same object, a processor configured to implement a classification model or regression model, supply the received superposition to the classification model or regression model and to determine a characteristic of the object from an output of the classification model or regression model in response to being supplied with the received superposition.

Example 2b is the communication system of Example 1b, wherein the classification model or regression model is a classification model including, for each of a plurality of object classes, a hyperdimensional code word representing the object class and wherein the processor is configured to classify the object by correlating the received superposition code word, for each object class, with the hyperdimensional code word representing the object class and generating a classification result corresponding to the object class represented by a hyperdimensional code word fulfilling a predetermined criterion based on correlation results(i.e. based on the results of the correlating of the received superposition code word, for each object class, with the hyperdimensional code word representing the object class).

Example 3b is the communication system of Example 1b, wherein the processor is configured to correlate the hyperdimensional code word with the stored superposition by calculating an inner product with the stored superposition.

Example 4b is the communication system of Example 1b, including the plurality of transmitters wherein the transmitters are configured to transmit the hyperdimensional code words to superimpose on the wireless communication channel.

Example 5b is the communication system of Example 4b, wherein the transmitters are configured to use the same spectral resources to transmit the hyperdimensional code words.

Example 6b is the communication system of Example 4b, wherein each transmitter is configured to scale the hyperdimensional code word it transmits to compensate a channel response between the transmitter and the receiver.

Example 7b is the communication system of Example 4b, wherein each transmitter is configured to encode the hyperdimensional code word according to a linear code and the receiver is configured to decode the received superposition according to the linear code.

Example 8b is the communication system of Example 4b, wherein each transmitter is configured to modulate the symbols of the hyperdimensional code word it transmits with a modulation sequence, wherein the modulations sequences of different transmitters of the set of transmitters are orthogonal and wherein the receiver is configured to observe, for each hyperdimensional code word symbol, a sequence of received symbols shorter than the modulation sequence and to estimate each symbol of the superposition of hyperdimensional code words from a power of a corresponding sequence of received symbols.

Example 9b is a method for examining an object including receiving, from a plurality of transmitters, via a wireless communication channel, a superposition of transmitted hyperdimensional code words, including, for each transmitter of the plurality of transmitters, a hyperdimensional code word transmitted via the wireless communication channel encoding data of the same object, supplying the received superposition to a classification model or regression model; and determining a characteristic of the object from an output of the classification model or regression model in response to being supplied with the received superposition.

Example 10b is the method of Example 9b, wherein the classification model or regression model is a classification model including, for each of a plurality of object classes, a hyperdimensional code word representing the object class and the method includes classifying the object by correlating the received superposition code word, for each object class, with the hyperdimensional code word representing the object class and generating a classification result corresponding to the object class represented by a hyperdimensional code word fulfilling a predetermined criterion based on correlation results.

Example 1c is a communication device including a receiver configured to receive a sequence of symbols of a transmitted hyperdimensional code word, a processor configured to correlate the received sequence of symbols with each of a plurality of candidate hyperdimensional code words, symbol-by-symbol, for each of the plurality of candidate hyperdimensional code words, aggregate, for each symbol of the sequence of symbols, the result of the correlation for the symbol with the results of the correlations for the previous symbols of the sequence of symbols, to generate a total correlation result for the symbol for the candidate hyperdimensional code word, output, if for a symbol a predetermined reliability criterion is fulfilled, a received source data element or a hyperdimensional code word corresponding to the candidate hyperdimensional code word which gives a maximum total correlation result for the symbol.

Example 2c is the communication device of Example 1c, wherein the processor is configured to check, for each symbol of the sequence of symbols, whether the predetermined reliability criterion is fulfilled.

Example 3c is the communication device of Example 1c, including comparing, successively for the symbols of the sequence of symbols, the total correlation results for the candidate hyperdimensional code words, wherein the predetermined reliability criterion is that the comparison of the total correlation results indicates that one of the candidate hyperdimensional code words is equal to the transmitted hyperdimensional code word with a predefined minimum reliability and wherein the processor is configured to, when the predetermined reliability criterion is fulfilled, output the one of the candidate hyperdimensional code words as received hyperdimensional code word or a source data element corresponding to the one of the candidate hyperdimensional code words as received source data element.

Example 4c is the communication device of Example 1c, wherein the predetermined reliability criterion is a predefined number of symbols of the received sequence of symbols having been correlated with the plurality of candidate hyperdimensional code words.

Example 5c is the communication device of Example 4c, wherein the predefined number of symbols is smaller than the number of symbols of the received sequence of symbols.

Example 6c is the communication device of Example 4c, including determining the predefined number of symbols from a latency requirement of the transmission of the received sequence of symbols.

Example 7c is the communication device of Example 1c, wherein the processor is configured to stop correlating the received sequence of symbols with the plurality of candidate hyperdimensional code words if for a symbol, the predetermined reliability criterion is fulfilled.

Example 8c is the communication device of Example 1c, including a transmitter configured to, if for a symbol, the predetermined reliability criterion is fulfilled, transmit a message to a sender of the transmitted hyperdimensional code word indicating that the sender should stop transmitting the sequence of symbols.

Example 9c is the communication device of Example 1c, wherein, for each candidate hyperdimensional code word, correlating the received sequence of symbols with the candidate hyperdimensional code word symbol-by-symbol includes, for each symbol of the received sequence of symbols, multiplying symbol with a corresponding symbol of the candidate hyperdimensional code word.

Example 10c is the communication device of Example 1c, including, for each candidate hyperdimensional code word, correlating the received sequence of symbol with the candidate hyperdimensional code word and aggregating, for each symbol of the sequence of symbols, the result of the correlation for the symbol with the results of the correlations for the previous symbols of the sequence of symbols, such that the total correlation result is equal to the inner product of the received sequence of symbols with the candidate hyperdimensional code word up to the symbol.

Example 11c is the communication device of Example 1c, wherein the communication device is configured to output, for each of multiple symbols of the sequence of symbols, a received source data element or a received hyperdimensional code word corresponding to the candidate hyperdimensional code word which gives a maximum total correlation result for the symbol.

Example 12c is a method for receiving data including:
  receiving a sequence of symbols of a transmitted hyperdimensional code word;
  correlating the received sequence of symbols with each of a plurality of candidate hyperdimensional code words, symbol-by-symbol;
  for each of the plurality of candidate hyperdimensional code words, aggregating, for each symbol of the sequence of symbols, the result of the correlation for the symbol with the results of the correlations for the previous symbols of the sequence of symbols, to generate a total correlation result for the symbol for the candidate hyperdimensional code word; and
  outputting, if for a symbol a predetermined reliability criterion is fulfilled, a received source data element or a received hyperdimensional code word corresponding to the candidate hyperdimensional word which gives a maximum total correlation result for the symbol.

Example 13c is the method of Example 12c, including checking, for each symbol of the sequence of symbols, whether the predetermined reliability criterion is fulfilled.

Example 1d is a communication device including a processor configured to code data to a hyperdimensional code word, determine an amount of information contained in the hyperdimensional code word and compress the hyperdimensional code word depending on the amount of information contained in the hyperdimensional code word and a transmitter configured to transmit the compressed code word.

Example 2d is the communication device of Example 1d, wherein the processor is configured to compress the hyperdimensional code word with a compression ratio which is the lower the higher the amount of information contained in the hyperdimensional code word is.

Example 3d is the communication device of Example 1d, wherein the information is semantic information.

Example 4d is a method for transmitting data including coding data to a hyperdimensional code word, determining an amount of information contained in the hyperdimensional code word, compressing the hyperdimensional code word depending on the amount of information contained in the hyperdimensional code word and transmitting the compressed code word.

Example 5d is the method of Example 4d, including compressing the hyperdimensional code word with a compression ratio which is the lower the higher the amount of information contained in the hyperdimensional code word is.

Example 1e is a communication device including a processor configured to determine an amount of information contained in a data word and code the data word to a hyperdimensional code word with a code length depending on the amount of information contained in the data word and a transmitter configured to transmit the code word.

Example 2e is the communication device of Example 1e, wherein the processor is configured to code the data word to a hyperdimensional code word with a code length which is the higher the higher the amount of information contained in the data word is.

Example 3e is the communication device of Example 1e, wherein the information is semantic information.

Example 4e is a method for transmitting data including determining an amount of information contained in a data word, coding the data word to a hyperdimensional code word with a code length depending on the amount of information contained in the data word and transmitting the code word.

Example 5e is the method of Example 4e, including coding the data word to a hyperdimensional code word with a code length which is the higher the higher. the amount of information contained in the data word is.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication system comprising:
  a receiver configured to receive, for each of a plurality of object classes, via a wireless communication channel shared among transmitters of a respective set of transmitters, a received superposition of transmitted hyperdimensional code words, comprising, for each transmitter of the respective set of transmitters, a hyperdimensional code word transmitted via the wireless communication channel and encoding data of an object of the object class acquired by the transmitter;
  a memory configured to store, for each of the plurality of object classes, the received superposition as a stored superposition in association with the class;
  a processor configured to:
    classify a hyperdimensional code word representing an object to be classified by correlating the hyperdimensional code word with each stored superposition;
    generate a classification result corresponding to the object class associated with a superposition fulfilling a predetermined criterion based on correlation results; and
    correlate the hyperdimensional code word with the stored superposition by calculating an inner product with the stored superposition.

2. The communication system of claim 1, wherein, for each object class, the superposition includes at least some transmitted hyperdimensional code words encoding data of the same object.

3. The communication system of claim 1, comprising, for each object class, the set of transmitters, wherein the transmitters of the set of transmitters are configured to transmit the hyperdimensional code words to superimpose on the wireless communication channel.

4. The communication system of claim 3, wherein the transmitter are configured to use the same spectral resources to transmit the hyperdimensional code words.

5. The communication system of claim 3, wherein each transmitter is configured to scale the hyperdimensional code word it transmits to compensate a channel response between the transmitter and the receiver.

6. The communication system of claim 3, wherein each transmitter is configured to encode the hyperdimensional code word according to a linear code and the receiver is configured to decode the received superposition according to the linear code.

7. The communication system of claim 6, wherein the memory is configured to store the received superposition in decoded form.

8. The communication system of claim 3, wherein each transmitter is configured to modulate symbols of the hyperdimensional code word it transmits with a modulation sequence, wherein the modulations sequences of different transmitters of the set of transmitters are orthogonal and wherein the receiver is configured to observe, for each hyperdimensional code word symbol, a sequence of received symbols shorter than the modulation sequence and to estimate each symbol of the superposition of hyperdimensional code words from a power of a corresponding sequence of received symbols.

9. The communication system of claim 1, wherein the predetermined criterion is that the superposition fulfilling the predetermined criterion is the superposition which gives a maximum correlation result.

10. A communication system comprising:
a receiver configured to receive, from a plurality of transmitters, via a wireless communication channel, a received superposition of transmitted hyperdimensional code words, comprising, for each transmitter of the plurality of transmitters, a hyperdimensional code word transmitted via the wireless communication channel encoding data of the same object;
a processor configured to;
implement a classification model or regression model;
supply the received superposition to the classification model or regression model;
determine a characteristic of the object from an output of the classification model or regression model in response to being supplied with the received superposition; and
transmit the hyperdimensional code words to superimpose on the wireless communication channel.

11. The communication system of claim 10, wherein the classification model or regression model is a classification model comprising, for each of a plurality of object classes, a hyperdimensional code word representing the object class and wherein the processor is configured to classify the object by correlating the received superposition, for each object class, with the hyperdimensional code word representing the object class and generating a classification result corresponding to the object class represented by a hyperdimensional code word fulfilling a predetermined criterion based on correlation results.

12. The communication system of claim 10, wherein the processor is configured to correlate the hyperdimensional code word with a stored superposition by calculating an inner product with the stored superposition.

13. The communication system of claim 1, wherein the transmitters are configured to use the same spectral resources to transmit the hyperdimensional code words.

14. A communication device comprising:
a receiver configured to receive a sequence of symbols of a transmitted hyperdimensional code word;
a processor configured to
correlate the received sequence of symbols with each of a plurality of candidate hyperdimensional code words, symbol-by-symbol;
for each of the plurality of candidate hyperdimensional code words, aggregate, for each symbol of the sequence of symbols, the result of the correlation for the symbol with the results of the correlations for the previous symbols of the sequence of symbols, to generate a total correlation result for the symbol for the candidate hyperdimensional code word;
check, for each symbol of the sequence of symbols, whether a predetermined reliability criterion is fulfilled; and
output, if for a symbol its predetermined reliability criterion is fulfilled, a received source data element or a hyperdimensional code word corresponding to the candidate hyperdimensional code word which gives a maximum total correlation result for the symbol.

15. The communication device of claim 14, comprising comparing, successively for the symbols of the sequence of symbols, the total correlation results for the candidate hyperdimensional code words, wherein the predetermined reliability criterion is that the comparison of the total correlation results indicates that one of the candidate hyperdimensional code words is equal to the transmitted hyperdimensional code word with a predefined minimum reliability and wherein the processor is configured to, when the predetermined reliability criterion is fulfilled, output the one of the candidate hyperdimensional code words as received hyperdimensional code word or a source data element corresponding to the one of the candidate hyperdimensional code words as received source data element.

16. The communication device of claim 14, wherein the predetermined reliability criterion is a predefined number of symbols of the received sequence of symbols having been correlated with the plurality of candidate hyperdimensional code words.

17. The communication device of claim 16, wherein the predefined number of symbols is smaller than the number of symbols of the received sequence of symbols.

* * * * *